United States Patent [19] [11] Patent Number: 4,851,504
Suzuki et al. [45] Date of Patent: Jul. 25, 1989

[54] CATIONICALLY-DYEABLE, THERMALLY-RESISTANT COPOLYESTER FIBER COMPRISING QUATERNARY PHOSPHONIUM ORGANIC SULFONATE GROUPS

[75] Inventors: Togi Suzuki, Matsuyama; Shinji Ohwaki, Minoo; Setsuo Yamada, Ashiya; Hironori Yamada; Kimihiro Ogawa, both of Matsuyama; Kohichi Iohara, Suita, all of Japan

[73] Assignee: Teijin Limited, Osaka, Japan

[21] Appl. No.: 144,507

[22] Filed: Jan. 15, 1988

[30] Foreign Application Priority Data

Feb. 26, 1987 [JP] Japan .................. 62-41532
Mar. 20, 1987 [JP] Japan .................. 62-64390
May 12, 1987 [JP] Japan .................. 62-113639
May 20, 1987 [JP] Japan .................. 62-121034

[51] Int. Cl.$^4$ ............................................. C08G 63/20
[52] U.S. Cl. ..................................................... 528/287
[58] Field of Search ......................................... 528/287

[56] References Cited

U.S. PATENT DOCUMENTS 3,732,183  5/1973  Popp et al. ................. 260/75 P
4,006,123  2/1977  Samuelson et al. ......... 260/75 P
4,038,258  7/1977  Singh et al. ................ 260/75 T
4,745,142  5/1988  Ohwaki et al. .............. 524/87

Primary Examiner—Maurice J. Welsh
Assistant Examiner—L. Henderson
Attorney, Agent, or Firm—Burgess, Ryan & Wayne

[57] ABSTRACT

An improved copolyester fiber capable of being dyed with cationic dyes and having an excellent brightness, heat resistance and a satisfactory mechanical strength comprises a copolyester resin comprising a polymerization product of at least one aromatic dicarboxylic acid compound, at least one alkylene diol compound and at least one quaternary phosphonium organic sulfonate of the formula (I):

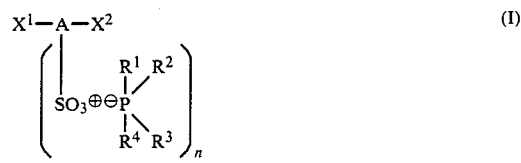

wherein A=an aromatic or aliphatic radical, $X^1$=H or an ester-forming organic radical, $X^2$=an ester-forming organic radical, $R^1$, $R^2$, $R^3$ and $R^4$=an alkyl or aryl radical, n=1 or more, and having an $[\eta]_f$ of 0.5 or more, the copolyester fiber having a silk factor of 25 or more and exhibiting the number of scission of backbone chains of the copolyester molecules of $140 \times 10^{23}$ or less per $10^6$ g of fiber when wet heat-treated in a solution of 0.4 g/l of acetic acid in distilled water at 130° for 60 minutes.

11 Claims, 1 Drawing Sheet

Fig. 1
Fig. 2
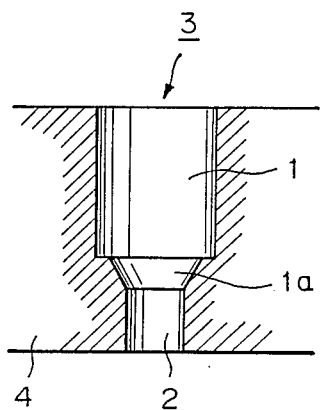
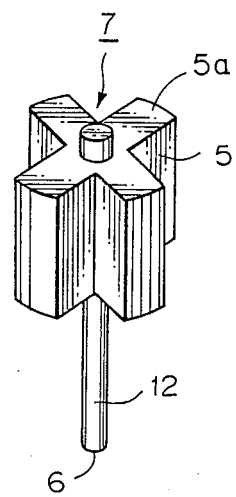
Fig. 3
Fig. 4
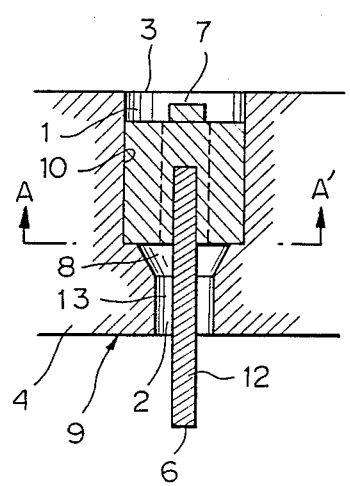
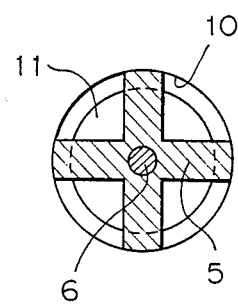

CATIONICALLY-DYEABLE, THERMALLY-RESISTANT COPOLYESTER FIBER COMPRISING QUATERNARY PHOSPHONIUM ORGANIC SULFONATE GROUPS

BACKGROUND OF THE INVENTION

1. Field of the Invention

The present invention relates to an improved copolyester fiber. More particularly, the present invention relates to an improved copolyester fiber capable of being dyed with cationic dyes and having a satisfactory mechanical strength and an excellent brightness.

2. Description of the Related Art

It is known that polyester resins have various excellent chemical and physical properties, and thus are useful for fibers (filaments) and films. However, it is also known that the polyester fibers exhibit a poor dyeability and are not easily dyed with dyes other than disperse dyes.

It is further known that, when the polyester fiber material dyed with a disperse dye is coated with a polymeric resin material, the resin-treated polyester fiber material exhibits a decreased fastness to laundering, ironing, and rubbing.

Due to the above-mentioned disadvantages, various attempts have been made to enhance the dyeability of polyester fibers.

In one such attempt, Japanese Examined Patent Publication (Kokoku) No. 34-10497 disclosed a copolyester fiber capable of being dyed with cationic dyes and produced from a copolyester resin containing an additional copolymerization component consisting of an isophthalic acid derivative having a metal sulfonate radical, for example, 5-sodium sulfoisophthalate, and copolymerized with a principal copolymerization component consisting of ethylene terephthalate.

The above-mentioned attempt is disadvantageous in that, where the metal sulfonate radical-containing isophthalic acid derivative is copolymerized in a necessary amount for enhancing the dyeability of the resultant copolyester fiber to a satisfactory level, with the principal copolymerization component, the resultant copolymerization product exhibits an excessively high melt viscosity due to the melt viscosity-increasing effect of the metal sulfonate radical-containing isophthalic acid derivative.

This makes it difficult to produce a copolyester resin having a satisfactorily high degree of polymerization. Also, the high melt viscosity copolyester resin causes a difficulty in melt-spinning when producing copolyester fibers.

Accordingly, it is necessary to reduce the melt viscosity of the copolyester resin containing the metal sulfonate radical-containing isophthalic acid derivative to an extent such that the copolymerization procedure for the copolyester resin can be easily carried out and the resultant copolyester resin can be readily melt-spun to form fibers. For this purpose, it is necessary to reduce the degree of polymerization of the copolyester resin, but the reduced degree of polymerization results in a decreased mechanical strength of the copolyester fibers. This decreased mechanical strength restricts the use of the resultant copolyester fibers capable of being dyed with cationic dyes. Japanese Examined Patent Publication (Kokoku) No. 47-22,334 and U.S. Pat. No. 3,732,183 disclosed a cationic dye-dyeable copolyester fiber consisting of a copolyester resin containing, as a copolymerization component for making the resultant copolyester fiber dyeable with cationic dyes, an isophthalic acid derivative having a phosphonium sulfonate radical.

The above-mentioned isophthalic acid derivative exhibits a low melt viscosity-increasing effect, and therefore, even if the resultant copolyester resin has a relatively high degree of polymerization, the melt viscosity of the copolymer resin is at a level such that the copolyester resin can be melt-spun in an ordinary melt-spinning method without difficulty. Accordingly, the copolyester resin can be used to provide cationic dye dyeable copolyester fibers having a high mechanical strength.

However, the above-mentioned copolyester resin is disadvantageous in that the thermal resistance of the phosphonium sulfonate radical-containing isophthalic acid derivative is lower than that of the metal sulfonate radical-containing isophthalic acid derivative. Accordingly, in the copolymerization step and melt-spinning step at a high temperature, the phosphonium sulfonate radical-containing isophthalic acid derivative component in the copolyester resin per se is decomposed, and sometimes promotes the thermal decomposition of the copolyester resin. The above-mentioned phenomena results in an undesirable discoloration (yellow brown) of the resultant copolyester resin or shaped article thereof and in a decrease in the degree of polymerization of the copolyester resin. Also, the discoloration of the copolyester fiber affects the hue of dyed copolyester fiber.

More specifically, the cationic dye dyeable copolyester fibers manufactured by the above-mentioned conventional methods have silk factors of 22 at the largest and scission numbers of $140 \times 10^{23}$ at the smallest per $10^6$ g of fiber, and it has proved absolutely impossible to put these fibers to practical use.

Due to the above-mentioned disadvantages, the copolyester containing, as a copolymerization component, the phosphonium sulfonate radical-containing isophthalic acid derivative has not been industrially used.

The inventors have striven to obtain copolyester fibers which exhibit an improved stability. As a result, utilizing the methods described later in detail, the inventors have succeeded for the first time in obtaining copolyester fibers which exhibit silk factors of 25 or more and scission numbers of $140 \times 10^{23}$ or less per $10^6$ g of fiber when wet heat-treated in a solution of 0.4 g/l of acetic acid in distilled water at a temperature of 130° C. for 60 minutes, and thus have made it possible, for the first time, to put the cationic dye dyeable copolyester fibers to a practical use requiring strong mechanical properties, especially for uses that require strong mechanical properties and an excellent dyeing fastness when coated or laminated with finishing agents, for example, resin materials (the dye fixed to the fibers must not be transferred to the resin layer), i.e., when used in, sports wear, etc.

SUMMARY OF THE INVENTION

An object of the present invention is to provide an improved copolyester fiber capable of being dyed with cationic dyes and having a satisfactory mechanical strength and an excellent brightness.

Another object of the present invention is to provide an improved copolyester fiber capable of being dyed with cationic dyes and having an enhanced resistance to thermal decomposition and discoloration.

The above-mentioned objects can be attained by the improved copolyester fiber of the present invention, which comprises a copolyester resin comprising a polymerization product of a principal copolymerization component comprising at least one aromatic dicarboxylic acid compound and at least one diol compound and 0.1 to 10 molar %, based on the molar amount of the aromatic dicarboxylic acid compound, of an additional copolymerization component consisting of at least one quaternary phosphonium organic sulfonate of the general formula (I):

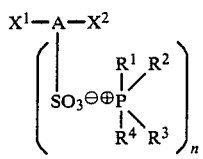

wherein A represents a member selected from aromatic and aliphatic radicals, $X^1$ represents a member selected from the group consisting of a hydrogen atom and ester-forming organic radicals, $X^2$ represents an ester-forming organic radical which may be the same as or different from that represented by $X^1$, $R^1$, $R^2$, $R^3$ and $R^4$ respectively represent, independently from each other, a member selected from the group consisting of alkyl radicals and aryl radicals and n is an integer of 1 or more, and having an intrinsic viscosity of 0.5 or more, determined in o-chloro phenol at a temperature of 35° C., said copolyester fiber having a silk factor of 25 or more and exhibiting a scission number of the backbone chains of the copolyester molecules of $140 \times 10^{23}$ or less per $10^6$ g of fiber when wet heat-treated in a solution of 0.4 g/l of acetic acid in distilled water at a temperature of 130° C. for 60 minutes.

BRIEF DESCRIPTION OF THE DRAWINGS

FIG. 1 is a vertical cross-section of a preferable embodiment of melt-spinning orifices for producing the copolyester fiber of the present invention;

FIG. 2 is a schematic view of a guide bar to be inserted into the melt-spinning orifice as shown in FIG. 1 for producing the copolyester fiber of the present invention;

FIG. 3 is a vertical cross-sectional view of the melt-spinning orifice shown in FIG. 1 combined with the guide bar shown in FIG. 2; and, FIG. 4 is a horizontal cross-sectional view of the orifice-guide bar combination, taken along line A—A' in FIG. 3.

DESCRIPTION OF THE PREFERRED EMBODIMENTS

The improved copolyester of the present invention comprises a specific copolyester resin which comprises a polymerization product of a principal copolymerization component and an additional copolymerization component.

The principal copolymerization component comprises at least one aromatic dicarboxylic acid compound and at least one alkylene diol compound polycondensed with each other to form alkylene aromatic dicarboxylate polymerization units in the copolyester.

The aromatic dicarboxylic acid compound is preferably selected from terephthalic acid, and naphthalene dicarboxylic acid. More preferably, terephthalic acid is used.

The alkylene diol compound is preferably selected from alkylene glycols having 2 to 4 carbon atoms, for example, ethylene glycol, trimethylene glycol and tetramethylene glycol. More preferably, ethylene glycol is used.

Preferably, the principal copolymerization component consists of terephthalic acid and ethylene glycol, which form ethylene terephthalate polymerization units of the copolyester.

In the copolymer resin usable for the present invention, a portion of the principal aromatic dicarboxylic acid compound, for example, terephthalic acid, may be replaced by at least one other polyfunctional carboxylic component and a portion of the principal alkylene diol compound, for example, ethylene glycol, may be replaced by at least one other polyol compound.

The other polyfunctional carboxylic acid compound is preferably selected from other aromatic dicarboxylic acids, for example, isophthalic acid, naphthalene dicarboxylic acid, diphenyldicarboxylic acid, diphenoxyethane dicarboxylic acid; aromatic hydroxycarboxylic acids, for example, $\beta$-hydroxyethoxybenzoic acid, p-hydroxy benzoic acid; and aliphatic and cycloaliphatic dicarboxylic acids, for example, adipic acid, sebacic acid, and 1,4-cyclohexanedicarboxylic acid. Also, the other difunctional carboxylic acid compound may include isophthalic acid derivatives having a metal sulfonate radical, for example, 5-sodium sulfoisophthalic acid.

The polyol compound other than the principal alkylene diol compounds can be selected from aliphatic, cycloaliphatic and aromatic diol compounds, for example, cyclohexane-1,4-dimethanol, neopentylglycol, bisphenol A and bisphenol S; and polyoxyalkylene glycol.

Furthermore, the other polyfunctional carboxylic acid compounds may include polycarboxylic acids, for example, trimellitic acid and pyromellitic acid, and the other polyol compounds may include polyol compounds, for example, glycerin, trimethylol propane and pentaerythritol, as long as the resultant copolyester is a substantially linear polymer.

The copolyester resin usable for the present invention can be produced by any conventional polyester-producing method in which, for example, polyethylene terephthalate resin is produced, in the first step, by directly reacting terephthalic acid with ethylene glycol, ester-exchange reacting a lower alkyl ester of terephthalic acid with ethylene glycol, or reacting terephthalic acid with ethylene oxide, to provide a glycol ester of terephthalic acid or an oligomer thereof, and then, in the second step, by polycondensing the above-mentioned product in the first step at an elevated temperature under a reduced pressure to provide a polymer having a desired degree of polymerization.

The additional copolymerization component usable for the present invention consists of at least one quaternary phosphonium organic sulfonate of the formula (I):

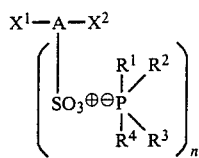 (I)

wherein A represents a member selected from aromatic and aliphatic radicals, preferably aromatic radicals, $X^1$ represents a member selected from the group consisting of a hydrogen atom and ester-forming organic radicals, preferably ester-forming organic radicals, $X^2$ represents an ester-forming organic radical which may be the same as or different from that represented by $X^1$, $R^1$, $R^2$, $R^3$ and $R^4$ respectively represent, independently from each other, a member selected from the group consisting of alkyl radicals and aryl radicals, and n is an integer of 1 or more, preferably 1 to 2.

The aromatic radical represented by A is preferably selected from those of the formulae:

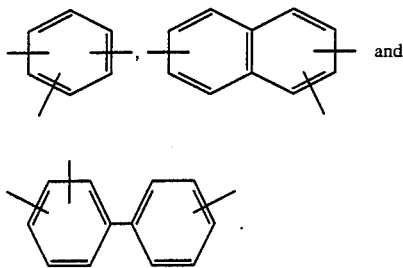

Also, the aliphatic radical represented by A is preferably selected from those of the formulae:

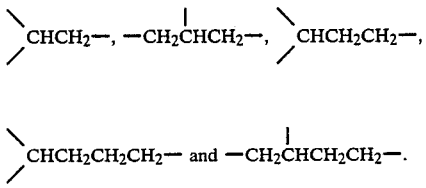

The ester-forming organic radical represented by $X^1$ and/or $X^2$ preferably selected from the group consisting of the radicals of the formulae:

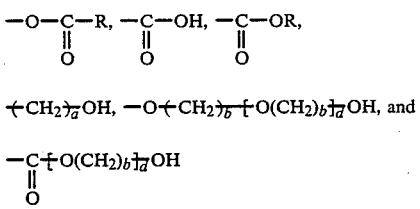

wherein R represents a member selected from the group consisting of lower alkyl radicals and phenyl radical, a is an integer of 1 or more, preferably 1 to 4, and b is an integer of 2 or more, preferably 2 to 4, and d is an integer of 1 or more, preferably 1 to 100.

The alkyl and aryl radicals represented by $R^1$, $R^2$, $R^3$ and/or $R^4$ preferably include methyl, ethyl, propyl, butyl, amyl, hexyl, heptyl, octyl, nonyl, decyl, lauryl, benzyl and phenyl radicals.

The quaternary phosphonium organic sulfonate of the formula (I) can be readily produced by the reaction of a corresponding organic sulfonic acid with a phosphine compound or of a metal salt of a corresponding organic sulfonic acid with a phosphonium halide compound.

Preferable specific examples of the phosphonium sulfonate compound of the formula (I) are: tetrabutyl phosphonium 3,5-dicarboxybenzene sulfonate, ethyltributyl phosphonium 3,5-dicarboxybenzenesulfonate, benzyltributyl phosphonium 3,5-dicarboxybenzenesulfonate, phenyltributyl phosphonium 3,5-dicarboxybenzenesulfonate, tetraphenyl phosphonium 3,5-dicarboxybenzenesulfonate, butyltriphenyl phosphonium 3,5-dicarboxybenzenesulfonate, benzyltriphenyl phosphonium 3,5-dicarboxybenzenesulfonate, tetrabutyl phosphonium 3,5-dicarbomethoxybenzenesulfonate, ethyltributyl phosphonium 3,5-dicarbomethoxybenzenesulfonate, benzyltributyl phosphonium 3,5-dicarbomethoxybenzenesulfonate, phenyltributyl phosphonium 3,5-dicarbomethoxybenzenesulfonate, tetraphenyl phosphonium 3,5-dicarbomethoxybenzenesulfonate, ethyltriphenyl phosphonium 3,5-dicarbomethoxybenzenesulfonate, butyltriphenyl phosphonium 3,5-dicarbomethoxybenzenesulfonate, benzyltriphenyl phosphonium 3,5-dicarboxybenzenesulfonate, tetrabutyl phosphonium 3-carboxybenzenesulfonate, tetraphenyl phopshonium 3-carboxybenzenesulfonate, tetrabutyl phosphonium 3-carbomethoxybenzenesulfonate, tetraphenyl phosphonium 3-carbomethoxybenzenesulfonate, tetrabutyl phosphonium 3,5-di($\beta$-hydroxyethoxycarbonyl) benzenesulfonate, tetraphenyl phosphonium 3,5-di($\beta$-hydroxyethyoxycarbonyl) benzenesulfonate, tetrabutyl phosphonium 3-($\beta$-hydroxyethoxycarbonyl) benzenesulfonate, tetraphenyl phosphonium 3-($\beta$-hydroxyethoxycarbonyl) benzenesulfonate, tetrabutyl phosphonium 4-hydroxyethoxybenzenesulfonate, tetrabutyl phosphonium 2,6-dicarboxynaphthalene-4-sulfonate, and $\alpha$-tetrabutylphosphonium sulfosuccinate.

The additional copolymerization component consists of only one compound or two or more compounds of the formula (I).

In the copolymerization of the additional copolymerization component with the principal copolymerization component, the additional component is added to the polymerization mixture of the principal component at at least one stage before the polymerization of the principal component is completed.

The amount of the additional copolymerization component to be copolymerized in the copolyester resin is in the range of from 0.1 to 10 molar %, preferably 0.3 to 5 molar %, based on the molar amount of the dicarboxylic acid compound contained in the principal copolymerization component. When the amount of the additional copolymerization component is less than 0.1 molar %, the resultant copolyester fiber exhibits an unsatisfactory cathionic dyeability. A further increase in the molar amount of the additional component to more than 10 molar % is not effective for enhancing the cationic dye-dyeability of the resultant copolyester fiber and causes a decrease in the physical properties of the resultant copolyester fiber.

The copolyester resin of the present invention may contain, as a further additional copolymerization component, 0.5 to 10.0 molar %, preferably 1.0 to 4.0 molar %, based on the molar amount of the additional copolymerization component, of at least one tertiary phosphonium organic sulfonate of the formula:

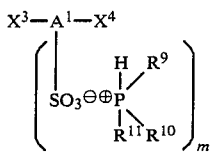

wherein $A^1$ represents a member selected from aromatic and aliphatic radicals, $X^3$ represents a member selected from the group consisting of a hydrogen atom and ester-forming organic radicals, $X^4$ represents an ester-forming organic radical which may be the same as or different from that represented by $X^3$, $R^9$ $R^{10}$, and $R^{11}$ respectively represent, independently from each other, a member selected from the group consisting of alkyl radicals and aryl radicals, and m is an integer of 1 or more.

The aromatic and aliphatic radicals represented by $A^1$ can be the same radicals represented by A in the formula (I).

The ester-forming radicals represented by $X^3$ and $X^4$ can be selected from the same radicals represented by $X^1$ and $X^2$ in the formula (I).

The alkyl and aryl radicals represented by $R^9$, $R^{10}$ and $R^{11}$ can be selected from the same radicals represented by $R^1$, $R^2$, $R^3$ and $R^4$ in the formula (I).

The tertiary phosphonium organic sulfonate can be readily produced by reacting a corresponding metal salt of organic sulfonic acid with a tertiary phosphonium halide.

The tertiary phosphonium organic sulfonate is effective for preventing undesirable decomposition of the quaternary phosphonium organic sulfonate in the copolymerization process, and for enhancing the brightness of the resultant copolyester fibers.

The tertiary phosphonium organic sulfonate usable for the present invention can be selected from: tributylphosphonium 3,5-dicarboxybenzenesulfonate, triethylphosphonium 3,5-dicarboxybenzenesulfonate, tripropylphosphonium 3,5-dicarboxybenzenesulfonate, triphenylphosphonium 3,5-dicarboxybenzenesulfonate, tribenzylphosphonium 3,5-dicarboxybenzenesulfonate, trihexylphosphonium 3,5-dicarboxybenzenesulfonate, trioctylphosphonium 3,5-dicarboxybenzenesulfonate, tricyclohexylphosphonium 3,5-dicarboxybenzenesulfonate, butyldiphenylphosphonium 3,5-dicarboxybenzenesulfonate, phenyldibutylphosphonium 3,5-dicarboxybenzenesulfonate, tributylphosphonium 3,5-dicarbomethoxybenzenesulfonate, triethylphosphonium 3,5-dicarbomethoxybenzenesulfonate, tripropylphosphonium 3,5-dicarbomethoxybenzenesulfonate, triphenylphosphonium 3,5-dicarbomethoxybenzenesulfonate, tribenzylphosphonium 3,5-dicarbomethoxybenzenesulfonate, trioctylphosphonium 3,5-dicarbomethoxybenzenesulfonate, tricyclohexylphosphonium 3,5-dicarbomethoxybenzenesulfonate, butyldiphenylphosphonium 3,5-dicarbomethoxybenzenesulfonate, phenyldibutylphosphonium 3,5-dicarbomethoxybenzenesulfonate, tributylphosphonium m-carbomethoxybenzenesulfonate, triphenylphosphonium m-carbomethoxybenzenesulfonate, tributylphosphonium 3,5-di(p-hydroxyethoxycarbonyl) benzenesulfonate, triphenylphosphonium 3,5-di($\beta$-hydroxyethoxycarbonyl) benzenesulfonate, tributylphosphonium m-($\beta$-hydroxyethoxycarbonyl) benzenesulfonate, triphenylphosphonium m-($\beta$-hydroxyethoxycarbonyl) benzenesulfonate, tributylphosphonium p-hydroxyethoxybenzenesulfonate, triphenylphosphonium p-hydroxyethoxybenzenesulfonate, tributylphosphonium 2,6-dicarboxynaphthalene-4-sulfonate, $\alpha$-tributylphosphonium sulfosuccinate.

The further additional copolymerization component consisting of at least one tertiary phosphonium organic sulfonate can be added to the copolymerization mixture at at least one stage before the copolymerization is completed together with or independently from the additional copolymerization component (quaternary phosphonium organic sulfonate).

Sometimes, in the production of the quaternary phosphonium organic sulfonate, a small amount of a corresponding tertiary phosphonium organic sulfonate is contained as a by-product in the resultant quaternary phosphonium organic sulfonate. As long as the amount of the tertiary phosphonium organic sulfonate is in the range mentioned above, the tertiary phosphonium salt-containing quaternary phosphonium organic sulfonate can be used for the present invention.

In the production of the improved copolyester fiber, the polyester resin preferably contains at least one quaternary onium salt which is effective for enhancing the heat-resistance of the resultant copolyester fiber. The quaternary onium salt may be selected from quaternary ammonium salts and quaternary phosphonium salts. The quaternary ammonium salts preferably include tetramethyl ammonium hydroxide, tetramethyl ammonium chloride, tetraethyl ammonium hydroxide, tetraethyl ammonium chloride, tetraethyl ammonium bromide, tetraethyl ammonium iodide, tetrapropyl ammonium hydroxide, tetrapropyl ammonium chloride, tetraisopropyl ammonium hydroxide, tetraisopropyl ammonium chloride, tetrabutyl ammonium hydroxide, tetrabutyl ammonium chloride, tetraphenyl ammonium hydroxide and tetraphenyl ammonium chloride. The quaternary phosphonium salts are preferably selected from those of the formula (II):

wherein X represents an anion residue having no ester-forming organic radical, and $R^5$, $R^6$, $R^7$ and $R^8$ respectively represent, independently from each other, an organic radical.

The ester-forming organic radical-free anion residue represented by X can be selected from halides, hydroxy, hydrosulfate, alkyl sulfates, alkylethersulfates, alkylsulfonates, alkylbenzenesulfonates, acetate, aliphatic carboxylates, phosphate and phosphite anions.

The organic radicals represented by $R^5$, $R^6$, $R^7$ and $R^8$ are preferably selected from aliphatic and aromatic radicals, for example, substituted and unsubstituted alkyl, cycloalkyl, aryl, aralkyl and hydroxyalkyl radicals.

The quaternary phosphonium salts of the formula (II) are preferably selected from: tetramethylphosphonium chloride, tetramethylphosphonium bromide, tetramethylphosphonium iodide, tetramethylphosphonium hydroxide, tetraethylphosphonium chloride, tetra-n-propylphosphonium chloride, tetraisopropylphosphonium chloride, tetrabutylphosphonium chloride, tetrabutylphosphonium bromide, tetrabutylphosphonium iodide, tetrabutylphosphonium hydroxide, butyltriphenylphosphonium chloride, hexadecyltributylphosphonium chloride, ethyltrihexylphosphonium chloride, cyclohexyltributylphosphonium chloride, benzyltributylphosphonium chloride, tetraphenylphosphonium chloride, tetraphenylphosphonium hydroxide, octyltrimethylphosphonium chloride, octyldimethylbenzylphosphonium chloride, lauryldimethylbenzylphosphonium chloride, lauryldimethylbenzylphosphonium hydroxide, stearyltrimethylphosphonium chloride, lauryltrimethylphosphonium ethosulfate, laurylbenzenetrimethylphosphonium methosulfate, lauryldimethyl-o-chlorobenzylphosphonium chloride, stearylethyldihydroxyethylphosphonium ethosulfate, tetrabutylphosphonium dodecylbenzenesulfonate, tetrabutylphosphonium tosylate, tetrabutylphosphonium stearate, tetrabutylphosphonium oleate, tetrabutylphosphonium phosphate, tetrabutylphosphonium phosphite, ethyltriphenylphosphonium bromide, tetrabutylphosphonium bromide, tetraphenylphosphonium bromide, ethyltriphenylphosphonium iodide, ethyltriphenylphosphonium bromide, benzyltriphenylphosphonium chloride, tributylallylphosphonium bromide, ethylene-bis-tris(2-cyanoethyl)phosphonium bromide, tris-2-cyanoethylallylphosphonium chloride, tetrakis(hydroxyethyl)phosphonium sulfate, and tetrakis(hydroxymethyl)phosphonium chloride.

Preferably, the quaternary onium salt is used in an amount of from 0.1 to 20 molar %, more preferably from 1.0 to 10.0 molar %, based on the molar amount of the additional copolymerization component in the copolymer resin, or in an amount of from 0.0005 to 2.0 molar % more preferably 0.001 to 1 molar %, based on the molar amount of the aromatic dicarboxylic acid compound in the principal copolymerization component.

When the amount of the quaternary onium salt is excessively small, the enhancement of the heat resistance of the resultant copolyester fiber is unsatisfactory. Also, if the quaternary onium salt is used in an excessively large amount, the resultant copolyester fiber exhibits a decreased heat resistance and is discolored yellow brown.

The quaternary onium salt is usually mixed with the copolyester resin at at least one stage before the copolymerization of the resin is completed, for example, at the stage in which the copolymerization components are mixed with each other, at the stage in which the first step reaction is carried out, at the stage between the first step reaction and the second step reaction, and/or at the stage in which the second step reaction is carried out.

The addition of the quaternary onium salt may be carried out before, after or simultaneously with the addition of the additional copolymerization. The quaternary onium salt may be preliminarily mixed with the additional copolymerization component and the mixture then may be added to the copolymerization mixture.

Also, in the production of a phosphonium organic sulfonate wherein a quaternary phosphonium salt, for example, quaternary phosphonium halide, reacts with a metal salt of organic sulfonic acid, a residual portion of the quaternary phosphonium salt is sometimes contained in the resultant phosphonium organic sulfonate. This residual quaternary phosphonium salt can be utilized for enhancing the heat resistance of the resultant copolyester fiber.

The copolyester resin usable for the present invention has an intrinsic viscosity of 0.5 or more, preferably 0.55 or more, more preferably 0.58 or more, still more preferably 0.64 or more, determined in a solvent consisting of o-chlorophenol at a temperature of 35° C. If the intrinsic viscosity is less than 0.5, the resultant copolyester fiber exhibits an unsatisfactory mechanical strength and brightness.

In the production of the copolyester fiber of the present invention, the copolyester resin is subjected to a melt-spinning process.

In a usual melt-spinning process, a polyester resin is melted at a temperture of 30° C. to 50° C. above the melting temperature of the polyester resin, and the polyester resin melt is extruded through a spinneret having one or more melt-spinning orifices.

Usually, polyethylene terephthalate copolymerized with a phosphonium organic sulfonate of the present invention has a melting point of 250° C. to 255° C. Therefore, in the above-mentioned usual melt-spinning process, this type of copolyester resin is melt-extruded at a temperature of 285° C. However, when the above-mentioned high melt-extruding temperature is applied, the phosphonium organic sulfonate-containing copolyester resin is sometimes thermally decomposed and discolored during the melt-extruding procedure, and the degree of polymerization of the copolyester resin is sometimes decreased. Therefore, sometimes, the melt-spun copolyester fibers have an unsatisfactorily low mechanical strength and brightness, and thus are useless for practical purposes.

The above-mentioned phenomenon is derived from the phenomenon that the melt-extruding temperature is very close to or higher than the thermal decomposition temperature of the phosphonium organic sulfonate. For example, tetrabutyl phosphonium sulfo-isophthalate has a thermal decomposition temperature of 305° C. Accordingly, even if the thermal decomposition of the phosphonium organic sulfonate can be effectively prevented by adding the quaternary onium salt to the copolyester resin, it is desirable to carry out the melt-extruding procedure at a lower temperature than the thermal decomposition temperature of the phosphonium organic sulfonate, for example, less than 305° C., preferably 275° to 300° C. Where this desired temperature is close to the melting point of the copolyester resin, and therefore, in a melt-extrusion of the copolyester resin at this relatively low temperature, sometimes, it is difficult to produce copolyester fibers usable for practical purposes. Accordingly, sometimes, a special method is necessary to carry out the above-mentioned relatively low temperature melt-extruding procedure for the copolyester resin.

This special method is disclosed in Japanese Unexamined Patent Publication (Kokai) No. 60-259619. In this special method, a copolyester resin is completely melted at a temperature of 30° C. above the melting point of the resin, and the copolyester melt is extruded through a spinneret heated at a temperature of 5° C. above the melting point of the copolyester resin. The spinneret has at least one melt-spinning orifice having an opening for feeding the polymer melt and another opening for extruding the polymer melt connected to the feeding opening, and a polymer melt-guide bar inserted into the orifice and having a lower end portion thereof in the form of a needle, the longitudinal axis of the polymer melt-guide bar extending along the axis of the orifice from the feeding opening and the extruding opening, at least from the lower portion of the feeding opening to below the extruding opening through the orifice. The lower end portion of the guide bar projects downward from the extruding opening of the orifice to the outside of the orifice.

In the above-mentioned special melt-spinning method, the melt-spinning orifice must be provided with a needle-shaped guide bar for the polymer melt extending downward through the extruding opening of the orifice to the outside of the orifice.

The special melt-spinning orifice will be further explained below by referring to FIGS. 1 to 4.

Referring to FIG. 1, a spinning orifice 3 is formed in a spinneret plate 4 and has a cylindrical hole 1 for feeding a polymer melt, a cylindrical hole 2 for extruding the polymer melt and having a smaller diameter than that of the feeding hole 1, and an intermediate hole 1a connecting therethrough the feeding hole 1 to the extruding hole 2 and converging from the feeding hole 1 to the extruding hole 2.

Referring to FIG. 2, a polymer melt guide bar 7 is composed of a support portion 5 having a plurality of wings 5a arranged at the same angular intervals and a bar portion 6 extending downward from the support portion 5 and in the form of a needle or bar having a circular cross section.

Referring to FIGS. 3 and 4, the guide bar 7 is inserted into the orifice 3 so that the support portion 5 of the guide bar 7 is received and supported by the feeding hole 1 and the bar portion of the guide bar 7 extends from the lower portion of the support portion 5 to the outside of the orifice 3 through the intermediate hole 1a and the extruding hole 2.

The lower portion 12 of the bar portion 6 is projected below the lower surface 9 of the spinneret plate 4. The longitudinal axis of the bar portion 6 extends along the axes of the feeding hole 1 and the extruding hole 2. When a polymer melt is supplied to the orifice 3, the melt flows through a plurality of passages 11 defined by the inside wall surface 10 of the feeding hole 1 and the peripheral surfaces of the wings 5a, through an annular passage 8 defined by the inside wall surface of the intermediate hole 1a and the peripheral surface of the bar portion 6 of the guide bar 7, and then through an annular passage 13 formed between the inside wall surface of the extruding hole 2 and the peripheral surface of the bar portion 6. The melt is extruded through the orifice 3 and flows along the lower portion 12 of the bar portion 6 of the guide bar 7 and then is withdrawn in the form of a filament from the lower end of the bar portion 6.

The spinning orifice 3 as shown in FIG. 1 has a similar form to that of an ordinary spinning orifice and a diameter of 0.8 to 5 mm which is larger than that of the ordinary spinning orifice.

In FIG. 1, the diameter of the feeding hole 1 must be large enough to receive the support portion of the guide bar. In view of the difficulty in forming the support portion, the diameter of the feeding hole 1 is preferably 3 mm or more. Also, the diameter of the extruding hole 2 is preferably 0.1 mm or more larger than the diameter of the bar portion 6 of the guide bar 7. However, depending upon the viscosity of the polymer melt, and denier of the fiber to be produced, the diameter of the extruding hole 2 and the diameter of the bar portion 6 are variable.

The form and structure of the support portions of the guide bar 7 are not limited to those indicated by FIG. 2 as far as the support portions can be firmly supported by the feeding hole 1 and a plurality of passages for the flow of the polymer melt can be formed in the feeding hole 1 and can be connected to the extruding hole 2 through the intermediate hole 1a. The support portion 5 may be in the form of a rod having the same diameter and length as those of the feeding hole 1 and provided with a plurality of perforations for the flow of the polymer melt, formed at the same intervals in parallel to the vertical axis of the feeding hole 1.

The shape of the bar portion 6 of the guide bar 7 is not limited to that indicated in FIGS. 2 and 3. That is, the bar portion 6 may be in the form of a circular column, cylinder or cone which may have an ice pick-shaped lower end portion, or an elliptic polygonal, for example, trigonal, quadrangular, pentagonal, etc., or other irregular column, cylinder or cone.

Further, hollow fibers can be produced by using a special guide bar provided with a hollow bar portion having a circular, polygonal or other irregular cross-sectional profile. Furthermore, a side-by-side type composite fibers can be produced by using another special guide bar having a bar portion which is formed so that the inside space in the orifice 3 is partitioned into two portions through which two different polymer melts are extruded. The guide bar can be applied to another special orifice for producing core-in-sheath type composite fibers.

In the combination of the orifice 3 with the guide bar 7 in the orifice shown in FIG. 3, it is important that the longitudinal axis of the guide bar 7 extend substantially along and in conformity with the longitudinal axis of the orifice 3, that is, of the feeding hole 1, the intermediate hole 1a, and the extruding hole 2. If the guide bar 7 is eccentrically arranged in the orifice, the flow speed of the polymer melt passing through the passage 13 becomes uneven. This phenomenon causes undesirable bending of the filamentary flow of the extruded polymer melt at a location below and close to the lower end of the extruding hole 2. Also, it is important that the lower portion 12 of the bar portion 6 is projected downward from the lower surface 9 of the spinneret 4 to the outside of the spinneret 4. The length of the projected portion of the bar portion 6 is variable, depending on the inside diameter of the extruding hole, the diameter of the bar portion 6 of the guide bar 7, the melt viscosity of the polymer melt, the extruding rate of the polymer melt, and the temperature of the spinneret. Usually, the length of the projected portion is in the range of from 1 to 30 mm, preferably from 2 to 20 mm. If the projected portion is excessively short, a strong and undesirable stress deformation of the filamentary flow of the extruded polymer melt occurs at a location below and close to the lower end of the extruding hole. This phenomenon is similar to that seen in an ordinary orifice. When the temperature of the spinneret is decreased to a lower level than that in an ordinary melt-spinning operation, the melt-extruding condition becomes unstable and the formation of weak filaments or breakages of filaments occurs even at a melt-extruding temperature close to the ordinary melt-extruding temperature. Therefore, the excessively short projected portion of the bar portion caused difficulties in the melt-spinning operation at a low temperature.

If the projected portion of the bar portion is excessively long, the temperature of the polymer melt is decreased to an excessive extent while the polymer melt flows along the projected portion of the bar portion, and sometimes, the polymer melt flow is solidified at a location below and close to the lower end of the projected portion, so that the drafting of the filamentary flow of the extended polymer melt becomes difficult or impossible.

In the above-mentioned specific low temperatures melt spinning method, the temperature of the spinneret is controlled so that the filamentary flow of the extruded polymer melt is not solidified before a drafting stress is applied thereto and the filamentary flow can be easily drafted without brittle fracture rather than elastic deformation thereof. Usually, the temperature of the spinneret is adjusted to a level of 5° C. above the melting point of the copolyester resin to be melt-extruded.

By the combination of the above-mentioned special low temperature melt-spinning method in which the temperature of the spinneret is controlled to a level of 280° C. or less, preferably 275° C. or less, with the specific copolyester resin of the present invention having an intrinsic viscosity of 0.5 or more, preferably, 0.55 or more, more preferably 0.58 or more, still more preferably 0.64 or more, it becomes possible to produce an improved copolyester fiber without a large decrease in the degree of polymerization of the copolymer resin and a decrease in the mechanical strength and discoloration of the resultant fiber.

The improved copolyester fiber of the present invention has a silk factor of 25 or more, preferably 27 or more, and exhibits a scission number of the backbone chains of the copolyester molecules of $140 \times 10^{23}$ or less, preferably $100 \times 10^{23}$ or less, per $10^6$ g of fiber when wet heat-treated in a solution of 0.4 g/l of acetic acid in distilled water at a temperature of 130° C. for 60 minutes.

The silk factor (SF) of fiber is determined in accordance with the following equation.

$$SF = TS \times \sqrt{E}$$

wherein TS represents a tensile strength in g/d of the fiber and E represents an ultimate elongation of the fiber.

Recently, the polyester fibers to be used for sports wear must be capable of being dyed to brilliant colors, and the dyed polyester fibers must exhibit an excellent light fastness. Also, the polyester fiber cloth must have an excellent tear strength. The tear strength of the cloth depends, from one aspect, on the wearing or knitting structure thereof, and from another aspect, on the intrinsic viscosity or degree of polymerization of the polyester resin of which the polyester fibers consist, and the silk factor of the polyester fibers.

When used in sports wear, the polyester fibers must have a high silk factor. Accordingly, the copolyester fibers of the present invention have a silk factor of 25 or more, preferably 27 or more.

Also, the copolyester fibers of the present invention must exhibit a high heat resistance corresponding to a scission number of backbone chains of the copolyester molecules of $140 \times 10^{23}$ or less, preferably $100 \times 10^{23}$ or less per $10^6$ g of fiber when the fibers are wet heat-treated in a solution of 0.4 g/l of acetic acid in distilled water at a temperature of 130° C. for 60 minutes.

The scission of the backbone chains of the copolyester molecules results in a decrease in the intrinsic viscosity of the copolyester fibers.

The scission number of the backbone chain can be determined from the original intrinsic viscosity of the non-wet heat treated copolymer fiber resin and the decreased intrinsic viscosity of the wet heat-treated copolymer fiber resin, in the following manner.

The original number of backbone chains in $10^6$ g of the non-treated copolyester fiber resin is determined by calculating the original number average molecular weight of the non-treated resin from the value of the original intrinsic viscosity of the non-treated resin, and by converting the resultant original number average molecular weight to the corresponding original number of the molecule chains in $10^6$ g of the non-treated resin.

The increased number of backbone chains in $10^6$ g of the wet heat-treated copolymer fiber resin is determined from the decreased intrinsic viscosity thereof, in the same manner as mentioned above.

The difference between the increased and original numbers of the backbone chains corresponds to the scission number of the backbone chains.

In the present invention, the scission number of the backbone chains is utilized as a parameter of the heat resistance of the copolymer fibers. Generally, a decrease in intrinsic viscosity as a parameter of the heat resistance of a polymer is variable, depending on the value of the original intrinsic viscosity of the polymer. That is, the larger the original intrinsic viscosity of non-heat treated polymer, the larger the decrease in the intrinsic viscosity due to the heat treatment, even when the scission number of backbone chains due to the heat treatment is constant.

However, the scission number of backbone chains due to the heat treatment does not depend on the value of the original intrinsic viscosity of the original number of molecular chains in a predetermined amount of polymer.

Accordingly, by using the scission number of backbone chains as a parameter of the heat resistance of the copolyester fiber resin, the heat resistance of the copolyester fibers of the present invention can be represented with a high accuracy at a high reproductivity. Also, it has been confirmed that the scission number of backbone chains of the copolyester resin in the copolyester fibers of the present invention very closely corresponds to the decrease or degradation in physical properties of the copolyester fibers, due to various processings including heat treatment, for example, false twisting and hard twisting procedures; or various after treatment procedures, for example, dyeing treatment, weight reducing alkali treatment, and resincoating treatment, and thus is very useful industrially.

In the present invention, the scission number of backbone chains in the copolyester fiber resin can be determined by the following specific method.

(1) Pre-treatment

A mass of copolyester fibers is scoured and air dried in an ordinary manner at a room temperature to provide a specimen.

(2) Wet Heat Treatment

The specimen is wet heat treated in a solution of 0.4 g/l of acetic acid in distilled water at a temperature of 130° C. for 60 minutes with shaking(weight ratio of solution to specimen, 50:1).

(3) Measurement of Intrinsic Viscosity

An intrinsic viscosity $[\eta]_i$ which is referred to as the initial intrinsic viscosity) of a non-treated specimen and another intrinsic viscosity $[\eta]_f$ (which is referred to as the final intrinsic viscosity) of the treated specimen are measured in the following manner.

A sample in an accurately weighted amount of 0.600 g is placed in a dissolving tube. A fractionated o-chlorophenol having a water content of 0.03% by weight or less is temperature-controlled to a constant level of 25°±0.5° C. and 50 ml of the o-chlorophenol is placed in the dissolving tube by using a constant delivery pipette. The sample in the o-chlorophenol is heated at a temperature of 100° C. for 60 minutes, while stirring at a stirring speed of 350 to 450 rpm, and is dissolved in o-chlorophenol. After the dissolution is completed, the dissolving tube is stoppered, tightly, and then cooled.

The viscosity of the resultant solution is measured at a temperature of 35°±0.1° C. by using an Ostwald viscometer, and then the value of the measured viscosity was converted to a corresponding intrinsic viscosity $[\eta]$ in accordance with the following equations:

$$[\eta] = \frac{-1 + \sqrt{1 + 4k'\eta_{sp}}}{2k'C}$$

$$\eta_{sp} = \eta_{rel} - 1$$

$$\eta_{rel} = \frac{L}{L_0} = \frac{C_1 t - C_2/t}{C_1 t_0 - C_2/t_0}$$

wherein L represents a kinematic viscosity of the solution, $L_0$ represents a kinematic viscosity of the solvent, o-chlorophenol, $C_1$ represents a viscometer constant determined in accordance with JIS Z-8803, $C_2$ represents a viscometer constant determined in accordance with JIS Z-8803, t represents the number in seconds of the viscosity measurement of the solution, $t_0$ represents the number in seconds of the viscosity measurement of the solvent, k' is the Huggins constant of 0.247, and C represents 1.200 g/100 ml.

(4) Number average molecular weight

The resultant intrinsic viscosities $[\eta]_i$ and $[\eta]_f$ are converted to corresponding number average molecular weights $\overline{M}_{ni}$ and $\overline{M}_{nf}$, respectively, in accordance with the following equations.

$$[\eta]_i = 3.07 \times 10^{-4} \overline{M}_{ni}^{0.77}$$

$$[\eta]_f = 3.07 \times 10^{-4} \overline{M}_{nf}^{0.77}$$

(5) Scission Number

The number [NS] of scissions of the backbone chains in the copolyester fiber resin per $10^6$ g of the fiber is calculated from the equation $$NS = 10^6 \left( \frac{1}{M_{nf}} - \frac{1}{M_{ni}} \right) \times 6 \times 10^{23}$$

wherein the value $6 \times 10^{23}$ is the Avogadro number.

The upper limit of the scission number, i.e., $140 \times 10^{23}/10^6$ g, of the fiber corresponds to a decrease from an initial intrinsic viscosity $[\eta]_i$ of 0.620 to a final intrinsic viscosity $[\eta]_f$ of 0.464, or from an $[\eta]_i$ of 0.500 to an $[\eta]_f$ of 0.394.

The improved copolyester fibers preferably have a luminosity factor (L) of 85 or more, more preferably, 91.0 or more, and a chromaticity factor (b) of 7.0 or less, more preferably 6.0 or less, defined in accordance with JIS Z-8730.

The luminosity factor (L) and chromaticity (b) of the fibers are calculated from the tristimulus values X, Y and Z defined in JIS Z-8722 and JIS Z-8727, measured by spectrocolorimetry in accordance with JIS Z-8722.

As stated hereinbefore, conventional phosphonium organic sulfonates are thermally unstable, and thus conventional copolyester fibers containing, as a copolymerization component, the conventional phosphonium organic sulfonate radicals, are easily discolored yellow brown. Accordingly, the conventional copolyester resin is produced and melt-spun in an ordinary manner, the resultant copolyester fibers exhibit a luminosity (L) of 70 to 80 and a chromaticity (b) of 8.5 to 10.0, and are yellowish. When the conventional copolyester fibers are dyed in the ordinary method, the resultant color is dull and is not practically useful.

The specific copolyester fibers of the present invention, which have, as an additional copolymerization component, the specific phosphonium organic sulfonate radicals, contain a quaternary onium salt and are produced preferably by the above-mentioned low temperature melt-spinning method, are very thermally stable and exhibit not only an enhanced heat resistance but also a high brightness and brilliant color when dyed.

The specific improved copolyester fibers of the present invention have the following advantages compared with conventional copolyester fibers containing as an additional copolymerization component, a conventional metal salt of organic sulfonic acid.

(1) The copolyester fibers of the present invention exhibit a higher diffusion velocity of cationic dyes than that of the conventional copolyester fibers, and thus can be colored to a desired color depth with a smaller amount of dye than that needed by the conventional copolyester fibers. The reasons for the above-mentioned advantages are not completely clear, but it is assumed that the higher cationic dye diffusion velocity of the copolyester fibers of the present invention than that of the conventional copolyester fibers occurs because the specific phosphonium organic sulfonate radical of the present invention has a larger cubic volume than that of the conventional metal organic sulfonate radical.

(2) The specific phosphonium organic sulfonate radical of the present invention does not exhibit a melt viscosity-increasing effect on the resultant copolyester resin, which effect usually appears on the conventional metal organic sulfonate radical, and accordingly, the copolyester resin of the present invention having a high degree of polymerization is readily melt-spun not only in an ordinary method but also even at a relatively low temperature, and the resultant cationic dye-diable copolyester fibers exhibit an excellent mechanical strength.

(3) The use of the specific phosphonium organic sulfonate in the copolymerization process causes the amount of undesirable by-products (foreign materials) produced during the copolymerization process is small, and thus an increase in pack pressure in a shaping process, especially melt-spinning process, and a decrease in quality of the resultant fiber due to the by-products, are very small.

(4) Due to the above-mentioned advantages (2) and (3), the copolyester of the present invention exhibits a very excellent fiber-forming property, and thus can be melt-spun at a super high take up speed of 3000 m/min or more, more particularly 5000 m/min or more. Also very fine copolyester fibers having a denier of 1 or less, particularly 0.5 or less can be produced in accordance with the present invention. The resultant fine copolyester fibers of the present invention have a satisfactory tensile strength of 3.5 g/d or more, which is remarkably higher than that of the conventional copolyester fibers, i.e., 2.5 or 3.0 g/d.

(5) The improved copolyester fibers of the present invention have an enhanced heat resistance. Therefore, even when processed, for example, false-twisted at a high temperature, a decrease in mechanical strength and fuse-bonding of the processed fibers or fiber yarns does not occur, and the resultant processed fibers or fiber yarns have an excellent quality.

(6) Although the conventional copolyester fibers having the conventional metal organic sulfonate radical have a very poor anti-static property, the improved copolyester fibers of the present invention exhibit an excellent anti-static property.

(7) The improved copolyester fibers exhibit a high flame-retardant property and anti-bacterial property, due to the specific phosphonium organic sulfonate radical.

(8) The improved copolyester fibers exhibits a high brightness, and thus, can be dyed to brilliant colors with cationic dyes.

(9) The improved copolyester fibers of the present invention can be dyed at a high temperature of 130° C. to 140° C., but the conventional cationic dye-dyeable copolyester fibers must be dyed at a relatively low temperature of 120° C. or less, because the copolymerized anionic radical is decomposed at a temperature above 120° C., and thus the physical and chemical properties of the dyed fibers are decreased. (The scission number of the conventional cationic dye-dyeable copolyester fibers is in a high level of $1000 \times 10^{23}$ or more per $10^6$ g fiber.)

The copolyester fibers of the present invention can be easily dyed to dark colors, for example, a deep black, at a temperature of 130° C. to 140° C. without degradation of the fibers.

(10) The copolyester fibers of the present invention dyed with a cationic dye exhibit a satisfactory wet fastness and an excellent fastness to dry transferring, even when the dyed fibers are coated with a polymeric resin material or a water-proof material. The cationic dye fixed to the copolyester fibers is not transferred to the resin coating layer.

(11) The improved copolyester fibers have a high resistance to discoloration and deterioration under light radiation or heat treatment.

(12) The resin coating layer formed on the copolyester fibers of the present invention exhibits an excellent durable resistance to laundering.

The above-mentioned advantages of the copolyester fibers of the present invention are obtained because the copolymerized phosphonium organic sulfonate radical is very stable and is not decomposed by ordinary melt-spinning, scouring, dyeing, heat-setting, resin finishing processes. This feature can be illustrated by the following experiment.

Three types (A, B and C) of copolyester fibers were produced. These fibers each had a different content of tetrabutylphosphonium (2.6, 2.2 and 1.7 molar %) sulfonate copolymerized with ethylene terephthalate units. Each type of fiber was used to make a knitted tube and scoure, heat-set and dyed with a cationic dye. After the dyeing procedure, the content of phosphorus in the dyed fibers was determined. The results are shown in Table 1.

TABLE 1

| Type of fiber | Content of P in original fiber | Dyed fiber | |
|---|---|---|---|
| | | Content of P | P-retaining % |
| A | 2.64 molar % | 2.62 molar % | 99.2 |
| B | 2.27 molar % | 2.24 molar % | 99.7 |
| C | 1.74 molar % | 1.73 molar % | 99.4 |

Table 1 clearly indicates that the phosphonium organic sulfonate radicals in the copolyester fibers of the present invention are very stable and are not decomposed and eliminated by the thermal and wet treatments.

As mentioned above, the improved copolyester fibers of the present invention having an excellent durability, brightness, cationic dye-dyeability, heat resistance, mechanical strength, anti-static property, flame-retardant property and anti-bacterial property, are very useful for sports clothing and other various uses.

The improved copolyester fibers of the present invention may contain an additive consisting of at least one member selected from, for example, catalysts, discoloration-preventing agents, heat resistance-promoting agents, flame-retardant agents, anti-oxidants, delusterants, coloring agents, and inorganic fillers.

The copolyester fibers of the present invention are usually used in the form of a woven fabric or knitted fabric made of filament yarns and/or staple fibers. The copolyester fiber fabric are usually dyed with a cationic dye.

Also, the copolyester fiber fabric may be impregnated, coated or laminated with a finishing agent, for example, resinous finishing agent, water proof agent, softening agent, etc.

The finishing agent can be selected from solutions or emulsions of resinous materials, for example, acrylic resins, polyurethane resins (including polyether type, and polyester type polyurethane resins), aromatic polyester resins and polyamino acid resins; and water proof agents, for example, fluorine-containing compounds, for example, perfluoroalkyl acrylates and silicone compounds.

The impregnation with the resinous material or water proof agent can be carried out by immersing or dipping the copolyester fiber fabric in a solution or emulsion of the resinous finishing agent and/or the water proof agent, by removing an excessive amount of the solution or emulsion from the fabric by squeezing or centrifugation, by drying the solution or emulsion-impregnated fabric and, if necessary, by curing the impregnated, dried fabric at an elevated temperature. Usually, the dry weight of the resinous finishing agent or water proof agent impregnated in the fabric is in the range of from 0.1 to 5% based on the weight of the fabric.

The coating can be effected by any ordinary coating methods, for example, floating knife coating, knife-on-roll coating, reverse roll coating, or roll doctor costing.

The coating resinous material can be selected from the polyether type and polyester type polyurethane resins, aromatic polyester resins and polyamino acid resins. The dry weight of the coating layer formed on the fabric is preferably in the range of from 1 to 100 g/m$^2$.

Optionally, the fabric is calendered by a heat pressing roll before the coating step. The calendering procedure is usually carried out at a temperature of 130° C. to 180° C. under a pressure of 10 to 80 kg/cm² at a fabric feeding speed of 5 to 20 m/min.

The lamination of the copolyester fiber fabric with a resinous membrane can be carried out as follows.

A porous, water-repellent resinous membrane, for example, porous polytetrafluoroethylene film is bonded to at least one surface of the copolyester fabric.

In another example, a porous polyurethane resin membrane which has been produced by coating a surface of a release film with a solution of a polyurethane resin, by coagulating the polyurethane resin solution layer in water and by separating the coagulated porous polyurethane resin membrane from the release film, is bonded to at least one surface of the copolyester fiber fabric.

In still another example, a moisture-permeable polyurethane resin membrane is prepared by an ordinary dry film-forming method, and is laminated and bonded to at least one surface of the copolyester fiber fabric.

Another example of the lamination will be described in detail below.

A resinous composition containing a two liquid type polyetherpolyol-modified polyurethane resin, a melamine derivative, an organic polyisocyanate compound, and a cross-linking catalyst was dissolved in an organic solvent, the solution was coated on a surface of a release sheet, for example, a polypropylene-coated paper or silicone-coated paper by an ordinary coating machine, for example, a knife coater, a cone coater or a kissroll coater. The dry weight of the coating layer is preferably in the range of from 3 to 20 g/m². The coating layer was dried and cured at a temperature of 120° C. to 160° C. The resultant cross-linked resinous membrane on the release sheet was coated with the same resinous composition solution as that mentioned above in a dry weight of 5 to 25 g/m², and the coated resinous composition solution layer was incompletely or completely dried in a dryer at a temperature of from 60° C. to 100° C., to provide a bonding resinous layer.

A copolyester fiber fabric was superimposed on the bonding resinous layer and the resultant laminate was heat-pressed at a temperature of 100° C. to 130° C. under a pressure of 3 to 30 kg/cm². After the heat pressing procedure was completed, the release sheet was removed from the resultant laminate sheet.

The copolyester fiber fabric of the present invention can be treated with various finishing agents and utilized for various purposes, for example, for wind breakers, overcoats, sports slacks, kilting winter clothes, down jackets, umbrellas, parasols, tents, bags, cover sheets, artificial leathers, artificial suede, artificial upper leathers for shoes, substrate sheets for rubber articles, dustless clothes, anti-radiation clothes, and various types of sheets for sails, paragliders, curtains and car seats.

The present invention will be further explained by way of specific examples, which, however, are merely representative and do not restrict the scope of the present invention in any way.

In the examples, the following measurements were carried out.

(1) Intrinsic Viscosity [η]

The intrinsic viscosity of polymers was measured in a solvent consisting of o-chlorophenol at a temperature of 35° C.

(2) Softening Point (sp)

The softening point of polymers was determined by a penetration method.

(3) Content of Diethyleneglycol (DEG)

The content of diethyleneglycol (DEG) in polymers was determined by heat decomposing the polymers with hydrated hydrazine, and subjecting a resultant upper clear liquid fraction to a gas chromatographic analysis in which 1,4-butanediol was used as an internal standard.

(4) Heat Resistance

The heat resistance of polymers was determined by the following method.

After a polymerization procedure for a polymer in a polymerization vessel was completed, the resultant polymer was withdrawn from the polymerization vessel while controlling the withdrawing time to 60 minutes or more by controlling a pressure of nitrogen gas used for withdrawing the polymer. The heat resistance of the polymer was evaluated from the difference between an intrinsic viscosity of the polymer 10 minutes after the start of the polymer withdrawing procedure, which is represented by $[\eta]_{10\ min}$, and another intrinsic viscosity of the polymer 60 minutes after the start of the polymer withdrawing operation, which is represented by $[\eta]_{60\ min}$.

(5) The softening point, hue (brightness), amount of terminal carboxyl radicals, and content of DEG in the resultant polymer were measured at a stage 30 minutes after the start of the withdrawing procedure of the polymer from the polymerization vessel.

Examples 1 to 7 and Comparative Example 1 and 2

In each of Example 1 and Comparative Example 1, an ester exchange reaction vessel was charged with 100 parts by weight of dimethyl terephthalate, 60 parts by weight of ethyleneglycol, 1.7 molar %, based on the molar amount of dimethyl terephthalate, of tetra-n-butylphosphonium 3,5-dicarbomethoxybenzene sulfonate, tetra-n-butylphosphonium bromide in the amount indicated in Table 2, 0.03 parts by weight (0.024 molar % based on the molar amount of dimethyl terephthalate) of manganese acetate tetrahydrate and 0.009 parts by weight (0.007 molar % based on the molar amount of dimethyl terephthalate) of a color-regulating agent consisting of cobalt acetate tetrahydrate, the resultant reaction mixture was subjected to an ester exchange reaction in a nitrogen gas atmosphere while raising the temperature of the reaction mixture from 140° C. to 220° C. over a period of 3 hours, and removing methyl alcohol produced as a by product from the vessel to the outside thereof. It was confirmed that the ester exchange reaction was smoothly carried out without retardation. The resultant reaction mixture was mixed with 0.03 parts by weight (0.033 molar % based on the molar amount of dimethyl terephthalate) of a 56% aqueous solution of orthophosphonic acid, and then immediately heated to eliminate an excessive amount of ethyleneglycol from the reaction mixture. Ten minutes after the start of the heating, the reaction mixture was mixed with 0.04 parts by weight (0.027 molar % based on the molar amount of dimethyl terephthalate) of a polycondensation catalyst consisting of antimony trioxide. At the stage at which the inside temperature of the reaction vessel reached 240° C., the elimination of ethyleneglycol was stopped and the reaction mixture was moved to a polymerization vessel and heated under ambient atmospheric pressure until the temperature of the reaction mixture reached 260° C. Thereafter, the pressure in the polymerization vessel was reduced from 760 mmHg to 1 mmHg over a period of one hour, and simultaneously, the temperature of the reaction mixture was elevated to 280° C. over a period of 90 minutes. The reaction mixture was further heated at a polymerization temperature of 280° C. under a reduced pressure of 1 mmHg for 2 hours and then nitrogen gas was introduced to the polymerization vessel to break the vacuum and to stop the polymerization. The resultant copolyester resin was withdrawn from the polymerization vessel at a temperature of 280° C. under a pressure of the introduced nitrogen gas.

The resultant copolyester resin had the softening point (SP), diethyleneglycol content by weight, 10 minute withdrawing stage intrinsic viscosity $[\eta]_{10\ min}$ and 60 minute withdrawing stage intrinsic viscosity $[\eta]_{60\ min}$ as shown in Table 2.

The copolyester resin was completely melted at a temperature of 290° C. in a melt spinning apparatus having a spinneret having 24 melt-spinning orifices, in which the extruding hole had a diameter of 0.3 mm and a length of 0.6 mm.

The extruding rate of the copolyester resin melt was adjusted such that when the resultant filaments were drawn at such a draw ratio as the resultant drawn filaments exhibited an ultimate elongation of 30%, a thickness of the resultant individual filament fell in about 3 denier. The resultant filaments were taken up at a speed of 1000 m/min.

The resultant undrawn filaments had intrinsic viscosity $[\eta]_f$ as shown in Table 3.

The undrawn filaments were drawn at a preheating temperature of 80° C. to an extent such that the resultant drawn filaments exhibit an ultimate elongation of 30%, and then heat set by heating the drawn filaments at a temperature of 130° C. on a heating plate.

The drawn, heat set filaments had the individual filament thickness (d), tensile strength (g/d), and silk factor, L* and b* values and scission number (number of scissions of backbone chains of copolyester molecules per $10^6$ g of filaments) as shown in Table 3.

In each of Example 2 and Comparative Example 2, the same procedures as those described in Example 1 were carried out except that the tetra-n-butylphosphonium 3,5-dicarbomethoxybenzenesulfonate was replaced by tetraphenylphosphonium 3,5-dicarboxybenzenesulfonate in the amount shown in Table 2, the tetra-n-butylphosphonium bromide was replaced by tetraphenylphosphonium hydroxide, and they were added to the reaction mixture after the ester exchange reaction was completed.

In each of Examples 3 to 6, an ester exchange reaction was carried out by charging an ester exchange reaction vessel with a reaction mixture of 100 parts by weight of dimethyl terephthalate with 60 parts by weight of ethyleneglycol, 0.03 parts by weight (0.024 molar % based on the molar amount of the dimethyl terephthalate) of manganese acetate tetrahydride and 0.009 parts by weight (0.007 molar % based on the molar amount of the dimethyl terephthalate, by elevating the temperature of the reaction mixture from 140° C. to 220° C. over a period of 3 hours in the nitrogen gas atmosphere while blowing nitrogen gas through the reaction vessel, and removing a by-product consisting of methyl alcohol from the vessel. The resultant reaction mixture was mixed with the phosphonium organic sulfonate in the amount shown in Table 2 and with 0.03 parts by weight (0.033 molar % based on the molar amount of the dimethyl terephthalate) of a stabilizer consisting of ortho phosphonic acid in the form of a 56% aqueous solution thereof, and the quaternary onium salt indicated in Table 2, and the elimination of the excessive amount of ethyleneglycol at an elevated temperature, was started. Ten minutes after the start of the ethyleneglycol elimination, 0.04 part by weight (0.027 molar % based on the molar amount of the dimethyl terephthalate) of a polycondensation catalyst consisting of antimony trioxide was added to the reaction mixture. When the internal temperature of the reaction vessel reached 240° C., the ethyleneglycol elimination was stopped, and the reaction mixture was moved to a polymerization vessel. The reaction mixture in the polymerization vessel was subjected to polymerization under ambient atmospheric pressure until the temperature of the inside of the polymerization vessel reached 260° C. Thereafter, the pressure of the polymerization vessel was reduced from 760 mmHg to 1 mmHg over a period of one hour, and simultaneously, the temperature of the polymerization mixture was elevated to 280° C. over a period of 90 minutes. The polymerization procedure was further continued at the reduced pressure of 1 mmHg at the temperature of 280° C. for 2 hours.

In Example 7, the same procedures as those disclosed in Example 4, the tetra-n-butylphosphonium 3,5-dicarboxybenzenesulfonate was replaced by tetra-n-butylphosphonium dicarbomethoxybenzenesulfonate and this phosphonium sulfonate compound was added to the reaction mixture before the start of the ester exchange reaction.

It was confirmed that when the addition of the phosphonium sulfonate compound was effected before the ester exchange reaction, the ester exchange reaction was carried out smoothly without retardation.

The results are shown in Table 3.

TABLE 2

| Example No. | Phosphonium organic sulfonate Type | Amount (molar %/DMT) | Quaternary onium salt Type | Amount (molar %/DMT) | SP (°C.) | DEG content (wt %) | Copolyester resin Heat resistance $[\eta]$10 min | $[\eta]$60 min |
|---|---|---|---|---|---|---|---|---|
| Example 1 | CH₃OOC—⬡(COOCH₃)(SO₃⁻P⁺Bu₄) | 1.7 | Bu₄P⁺Br⁻ | 0.050 | 253.5 | 1.68 | 0.672 | 0.648 |
| Comparative Example 1 | " | 1.7 | — | 0 | 253.5 | 1.67 | 0.576 | 0.521 |
| Example 2 | HOOC—⬡(COOH)(SO₃⁻P⁺(C₆H₅)₄) | 1.7 | (C₆H₅)₄P⁺OH⁻ | 0.050 | 253.4 | 1.65 | 0.674 | 0.653 |
| Comparative Example 2 | " | 1.7 | — | 0 | 253.1 | 1.67 | 0.583 | 0.532 |
| Example 3 | HOOC—⬡(COOH)(SO₃⁻P⁺Bu₄) | 1.7 | Bu₄NOH | 0.003 | 253.3 | 1.63 | 0.673 | 0.651 |
| 4 | " | 1.7 | Bu₄NCl | 0.050 | 254.0 | 1.70 | 0.675 | 0.646 |
| 5 | " | 2.5 | Bu₄NOH | 0.100 | 252.5 | 1.85 | 0.648 | 0.617 |
| 6 | HOOC—⬡(COOH)(SO₃⁻P⁺(C₆H₅)₄) | 1.7 | (C₆H₅)₄NOH | 0.050 | 253.2 | 1.85 | 0.673 | 0.652 |
| 7 | CH₃OOC—⬡(COOCH₃)(SO₃⁻P⁺Bu₄) | 1.7 | Bu₄NCl | 0.050 | 252.7 | 1.84 | 0.683 | 0.656 |

TABLE 3

| Example No. | Drawn filaments | | | | | | Scission number ($\times 10^{23}$) |
|---|---|---|---|---|---|---|---|
| | $[\eta]_f$ | Denier | Tensile strength (g/d) | Silk factor | L* | b* | |
| Example 1 | 0.625 | 3.0 | 5.0 | 27.6 | 84.7 | 6.8 | 67 |
| Comparative Example 1 | 0.480 | 3.0 | 3.8 | 21.3 | 79.8 | 14.9 | 152 |
| Example 2 | 0.630 | 3.0 | 5.2 | 28.4 | 84.9 | 7.6 | 65 |
| Comparative Example 2 | 0.495 | 3.0 | 3.7 | 20.9 | 78.8 | 15.5 | 145 |
| Example 3 | 0.623 | 3.0 | 5.3 | 29.0 | 85.3 | 7.5 | 96 |
| 4 | 0.615 | 3.0 | 4.8 | 26.8 | 85.4 | 7.3 | 72 |
| 5 | 0.600 | 3.0 | 5.0 | 27.6 | 86.3 | 7.5 | 64 |
| 6 | 0.600 | 3.0 | 5.2 | 28.9 | 84.8 | 7.3 | 82 |
| 7 | 0.620 | 3.0 | 5.3 | 29.3 | 84.9 | 7.2 | 68 |

Examples 8 to 18 and Comparative Examples 3 to 5

In each of Examples 8 to 13 and Comparative Example 3, an ester exchange reaction vessel was charged with a reaction mixture consisting of 100 parts by weight of dimethyl terephthalate, 60 parts by weight of ethyleneglycol, 0.03 parts by weight (0.024 molar % based on the molar amount of the dimethyl terephthalate) of manganese acetate tetrahydrate and 0.009 parts by weight (0.007 molar % based on the molar amount of the dimethyl terephthalate) of a color-regulating agent consisting of cobalt acetate tetrahydrate, and the reaction mixture was subjected to an ester exchange reaction in a nitrogen gas atmosphere by raising the temperature of the reaction mixture from 140° C. to 220° C. over a period of 3 hours while removing a by product consisting of methyl alcohol to the outside of the reaction system.

The resultant reaction product was mixed with tetra-n-butylphosphonium 3,5-dicarboxybenzenesulfonate in the amount indicated in Table 4 and in the form of a 20% solution thereof in ethyleneglycol, and then with tetra-n-butylphosphonium chloride in the amount indicated in Table 4 and in the form of an 85% solution thereof in water. The reaction mixture was stirred at a temperature of 22° C. for 20 minutes, then mixed with 0.03 parts by weight (0.033 molar % based on the molar amount of the dimethyl terephthalate) of a stabilizer consisting of orthophosphoric acid in the form of a 56% solution thereof in water, and simultaneously, subjected to an elimination procedure of an excessive amount of ethyleneglycol by raising the temperature of the reaction mixture. Ten minutes after the start of the elimination procedure, the reaction mixture was further mixed with 0.04 part by weight (0.027 molar % based on the molar amount of the dimethyl terephthalate) of a polycondensation catalyst consisting of antimony trioxide. When the temperature of the reaction mixture reached 240° C., the ethyleneglycol-elimination procedure was stopped, and the reaction mixture was moved to a polymerization vessel.

The reaction mixture in the polymerization vessel was heated under ambient atmospheric pressure until the temperature of the reaction mixture reached 260° C., then the pressure in the polymerization vessel was reduced from 760 mmHg to 1 mmHg over a period of one hour, and simultaneously, the temperature of the reaction mixture was raised to 280° C. over a period of 90 minutes. The polymerization procedure was continued at a temperature of 280° C. under a reduced pressure of 1 mmHg for 2 hours. Thereafter, nitrogen gas was fed into the polymerization vessel to break the vacuum and to stop the polymerization. The resultant copolyester resin was withdrawn from the polymerization vessel at a temperature of 280° C. under a pressure of the introduced nitrogen gas.

In Example 14, the same procedures as those described in Example 9 were carried out except that the tetra-n-butylphosphonium chloride was replaced by tetra-n-butylphosphonium hydroxide.

In Example 15, the same procedures as those described in Example 9 were carried out except that the tetra-n-butylphosphonium chloride was replaced by teraphenylphosphonium bromide.

In Example 16, the same procedures as those described in Example 9 were carried out except that the tetra-n-butylphosphonium 3,5-dicarboxybenzenesulfonate produced by reacting sodium 3,5-dicarboxybenzenesulfonate with tetra-n-butylphosphonium chloride containing 3.41 molar % (0.058 molar % based on the molar amount of the dimethyl terephthalate) of non-reacted tetra-n-butylphosphonium chloride was used and on quaternary phosphonium salt was added to the reaction mixture.

In each of Example 17 and Comparative Example 4, the same procedures as those described in Example 9 were carried out except that the tetra-n-butylphosphonium 3,5-dicarboxybenzenesulfonate was replaced by tetra-n-butylhosphonium 3,5-dicarbomethoxybenzenesulfonate, the tetra-n-butylphosphonium chloride was replaced by tetra-n-butylphosphomium bromide, and the above mentioned compounds were added to the reaction mixture before the ester exchange reaction.

The ester exchange reaction was smoothly carried out without retardation.

In each of Example 18 and Comparative Example 5, the same procedures as those described in Example 9 were carried out except that the tetra-n-butylphosphonium 3,5-dicarboxybenzenesulfonate was replaced by tetraphenylphosphonium 3,5-dicarboxybenzenesulfonate and the tetra-n-butylphosphonium chloride was replaced by tetraphenylphosphonium hydroxide.

Each of the resultant copolyester resins was subjected to the same melt-spinning process as that described in Example 1.

The test results of the copolyester resins and filaments are shown in Table 4.

TABLE 4

| Example No. | Phosphonium organic sulfonate Type | Amount molar %/ DMT | Quaternary phosphonium salt Type | Amount molar %/ DMT | SP (°C.) | DEG content (wt %) | L* | b* | The number terminal carboxyl radicals (Equivalent/ 10⁶ g) | Heat resistance [η]10 min | Heat resistance [η]60 min | Denier | Tensile strength (g/d) | Silk face tor | Scission number × 10²³ | [η] |
|---|---|---|---|---|---|---|---|---|---|---|---|---|---|---|---|---|
| Comparative Example 3 | HOOC-C₆H₃(COOH)-SO₃⁻P⁺Bu₄ | 1.7 | Bu₄P⁺Cl⁻ | 0 | 253.4 | 1.65 | 70.2 | 7.7 | 51.2 | 0.598 | 0.544 | 3.0 | 3.9 | 21.5 | 173 | 0.492 |
| Example 8 | " | 1.7 | " | 0.020 | 253.6 | 1.65 | 69.1 | 8.1 | 48.6 | 0.660 | 0.628 | 3.0 | 5.3 | 29.0 | 85 | 0.605 |
| 9 | " | 1.7 | " | 0.050 | 253.2 | 1.64 | 68.2 | 9.6 | 45.2 | 0.672 | 0.650 | 3.0 | 5.2 | 28.4 | 76 | 0.630 |
| 10 | " | 1.7 | " | 0.100 | 254.0 | 1.58 | 67.6 | 10.5 | 44.3 | 0.688 | 0.653 | 3.0 | 5.3 | 28.8 | 74 | 0.630 |
| 11 | " | 1.7 | " | 0.150 | 254.1 | 1.60 | 66.0 | 11.0 | 43.8 | 0.686 | 0.651 | 3.0 | 4.9 | 27.5 | 64 | 0.627 |
| 12 | " | 1.7 | " | 0.300 | 254.1 | 1.63 | 66.5 | 11.8 | 42.6 | 0.667 | 0.632 | 3.0 | 5.1 | 28.0 | 68 | 0.608 |
| 13 | " | 2.6 | " | 0.080 | 252.7 | 1.84 | 67.8 | 10.2 | 45.3 | 0.658 | 0.635 | 3.0 | 5.0 | 27.9 | 85 | 0.612 |
| 14 | " | 1.7 | Bu₄P⁺OH⁻ | 0.050 | 253.5 | 1.58 | 69.1 | 8.8 | 43.1 | 0.673 | 0.652 | 3.0 | 5.1 | 27.8 | 78 | 0.6 |
| 15 | " | 1.7 | 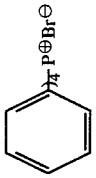 (Ph)₄P⁺Br⁻ | 0.050 | 252.8 | 1.70 | 67.2 | 10.0 | 45.6 | 0.675 | 0.650 | 3.0 | 5.3 | 29.1 | 88 | 0.625 |
| 16 | " | 1.7 | Bu₄P⁺Cl⁻ | 0.058 | 253.6 | 1.62 | 69.0 | 9.9 | 44.7 | 0.676 | 0.657 | 3.0 | 5.1 | 28.4 | 75 | 0.623 |
| Comparative Example 4 | CH₃OOC-C₆H₃(COOCH₃)-SO₃⁻P⁺Bu₄ | 1.7 | Bu₄P⁺Br⁻ | 0 | 253.5 | 1.67 | 67.2 | 11.8 | 63.1 | 0.576 | 0.521 | 3.0 | 3.8 | 21.3 | 152 | 0.480 |
| Example 17 | " | 1.7 | " | 0.050 | 253.5 | 1.68 | 65.1 | 13.2 | 48.7 | 0.672 | 0.648 | 3.0 | 5.2 | 28.6 | 52 | 0.625 |
| Comparative Example 5 | HOOC-C₆H₃(COOH)-SO₃⁻P⁺(Ph)₄ | 1.7 | " | 0 | 253.1 | 1.67 | 68.5 | 10.1 | 60.2 | 0.583 | 0.532 | 3.0 | 3.7 | 20.2 | 188 | 0.471 |
| Example 18 | " | 1.7 | " | 0.050 | 253.4 | 1.65 | 66.9 | 12.5 | 46.9 | 0.674 | 0.653 | 3.0 | 5.0 | 27.3 | 81 | 0.630 |

Examples 19 to 27 and Comparative Examples 6 to 8

In each of Examples 19 to 25 and Comparative Examples 6 to 8, the same procedures as those described in Example 8 were carried out except that after the ester exchange reaction was completed, the resultant ester exchange reaction mixture was mixed with a mixture of tetra-n-butylphosphonium 3,5-dicarboxybenzenesulfonate and tri-n-butylphosphonium 3,5-dicarboxybenzenesulfonate in the amounts indicated in Table 5 and in the form of a 20% solution thereof in hot ethyleneglycol, and then with tetra-n-butylphosphonium chloride in the amount shown in Table 5 and in the form of an 85% solution thereof in water.

The resultant copolyester resin was subjected to an ordinary melt spinning process to produce copolyester filament yarn having a yarn count of 75 denier/24 filaments and an individual filament thickness of 3 denier.

The resultant copolyester filament yarn was dyed with a dyeing liquid containing 2%, based on the weight of the yarn, of a cationic dye mixture of Cathilon Blue CD FRCH and Cathilon Blue CD FBLH (each a trademark of a cationic dye made by Hodogaya Chemical Co.) in a mixing weight ratio of 1:1, 3 g/l of sodium sulfate and 0.3 g/l of acetic acid at a temperature of 120° C. for 60 minutes. In Example 26, the same procedures as those described in Example 22 were carried out except that the tetra-n-butylphosphonium 3,5-dicarboxybenzenesulfonate was replaced by tetraphenylphosphonium 3,5-dicarboxybenzenesulfonate, the tri-n-butylphosphonium 3,5-dicarboxybenzenesulfonate was replaced by triphenylphosphonium 3,5-dicarboxybenzenesulfonate, and the tetra-n-butylphosphonium chloride was replaced by tetraphenylphosphonium hydroxide.

In Example 27, the same procedures as those disclosed in Example 22 were carried out except that the tetra-n-butylphosphonium 3,5-dicarboxybenzenesulfonate was replaced by tetra-n-butylphosphonium 3,5-dicarbomethoxybenzenesulfonate, the tri-n-butylphosphonium 3,5-dicarboxybenzenesulfonate was replaced by tri-n-butylphosphonium 3,5-dicarbomethoxybenzenesulfonate, the tetra-n-butylphosphonium chloride was replaced by tetra-n-butylphosphonium bromide, and the above-mentioned compounds were added to the ester exchange reaction mixture before the start of the ester exchange reaction.

The properties of the copolyester filaments and dyed filaments are shown in Table 6.

TABLE 5

| Example No. | Quaternary phosphonium organic sulfonate Type | Amount (molar %/DMT) | Tertiary phosphonium organic sulfonate Type | Amount (molar %/DMT) | Quaternary phosphonium salt Type | Amount (molar %/DMT) |
|---|---|---|---|---|---|---|
| Comparative Example 6 | HOOC—⌬—COOH with SO$_3^\ominus$P$^\oplus$Bu$_4$ | 1.7 | HOOC—⌬—COOH with SO$_3^\ominus$P$^\oplus$HBu$_3$ | 0 | Bu$_4$P$^\oplus$Cl$^\ominus$ | 0 |
| Example 7 | " | 1.7 | " | 0.017 | " | 0.020 |
| Example 19 | " | 1.7 | " | 0.017 | " | 0.050 |
| Example 20 | " | 1.7 | " | 0.017 | " | 0.200 |
| Example 21 | " | 1.7 | " | 0.017 | " | 0.100 |
| Example 22 | " | 1.7 | " | 0.034 | " | 0.050 |
| Example 23 | " | 1.7 | " | 0.068 | " | 0.300 |
| Example 24 | " | 1.7 | " | 0.170 | " | 0.100 |
| Example 25 | " | 2.6 | " | 0.052 | " | 0.400 |
| Comparative Example 8 | " | 1.7 | " | 0.260 | | |
| Example 26 | HOOC—⌬—COOH with SO$_3^\ominus$P$^\oplus$(—⌬)$_4$ | 1.7 | HOOC—⌬—COOH with SO$_3^\ominus$P$^\oplus$H(—⌬)$_3$ | 0.034 | (⌬)$_4$P$^\oplus$OH$^\ominus$ | 0.100 |
| Example 27 | CH$_3$OOC—⌬—COOCH$_3$ with SO$_3^\ominus$P$^\oplus$Bu$_4$ | 1.7 | CH$_3$OOC—⌬—COOCH$_3$ with SO$_3^\ominus$P$^\oplus$HBu$_3$ | 0.034 | Bu$_4$P$^\oplus$Br$^\ominus$ | 0.100 |

TABLE 6

| Example No. | Copolyester resin SP (°C.) | DEG content (wt %) | L* | b* | Number of terminal carboxyl radicals (equivalent/ $10^6$ g) | Heat resistance $[\eta]_{10\ min}$ | $[\eta]_{60\ min}$ | Dyed copolyester filament Hue | Copolyester filament $[\eta]_f$ | Denier | Tensile strength (g/d) | Silk factor | Scission number ($\times 10^{23}$) |
|---|---|---|---|---|---|---|---|---|---|---|---|---|---|
| Comparative Example | | | | | | | | | | | | | |
| 6 | 253.4 | 1.65 | 70.2 | 7.7 | 51.2 | 0.598 | 0.544 | Dull blue | 0.492 | 3.0 | 3.9 | 21.5 | 173 |
| 7 | 252.1 | 1.91 | 73.1 | 5.7 | 38.0 | 0.629 | 0.583 | Brilliant blue | 0.450 | 3.0 | 3.0 | 16.4 | 314 |
| Example | | | | | | | | | | | | | |
| 19 | 253.6 | 1.62 | 73.0 | 5.8 | 38.0 | 0.668 | 0.648 | Brilliant blue | 0.628 | 3.0 | 5.1 | 28.0 | 62 |
| 20 | 253.9 | 1.60 | 72.8 | 6.1 | 37.1 | 0.672 | 0.651 | " | 0.635 | 3.0 | 5.2 | 28.5 | 58 |
| 21 | 253.9 | 1.54 | 72.5 | 6.2 | 36.9 | 0.678 | 0.656 | " | 0.626 | 3.0 | 5.1 | 27.9 | 63 |
| 22 | 252.6 | 1.72 | 74.5 | 4.9 | 38.0 | 0.668 | 0.642 | " | 0.618 | 3.0 | 5.0 | 27.6 | 68 |
| 23 | 252.7 | 1.75 | 75.7 | 3.8 | 34.2 | 0.672 | 0.650 | " | 0.626 | 3.0 | 5.1 | 27.9 | 65 |
| 24 | 251.9 | 1.98 | 74.2 | 5.0 | 35.6 | 0.676 | 0.639 | " | 0.611 | 3.0 | 4.9 | 26.8 | 71 |
| 25 | 252.0 | 1.93 | 72.0 | 5.5 | 37.9 | 0.674 | 0.648 | " | 0.623 | 3.0 | 5.0 | 27.4 | 61 |
| Comparative Example 8 | 253.4 | 1.59 | 68.2 | 9.5 | 60.8 | 0.572 | 0.512 | Dull blue | 0.457 | 3.0 | 3.4 | 19.2 | 193 |
| Example 26 | 252.3 | 1.74 | 73.9 | 5.1 | 39.2 | 0.672 | 0.651 | Brilliant blue | 0.628 | 3.0 | 5.1 | 28.1 | 65 |
| Example 27 | 252.1 | 1.75 | 72.7 | 5.8 | 42.0 | 0.678 | 0.655 | " | 0.630 | 3.0 | 5.1 | 28.2 | 64 |

Examples 28 to 34 and Comparative Examples 9 to 11

In each of Examples 28 to 30 and Comparative Examples 9 to 11, the same procedures as those described in Example 1 were carried out with the following exception.

The ester exchange reaction product was mixed with tetra-n-butylphosphonium 3,5-dicarboxybenzenesulfonate in the amount shown in Table 7.

Also, the tetra-n-butylphosphonium chloride was replaced by tetraethylammonium hydroxide in the amount shown in Table 7 and in the form of a 10% solution thereof in water.

The resultant copolyester resin was pelletized by an ordinary method and dried.

The dryed copolyester resin pellets were melt-spun through a spinneret having 24 melt-spinning circular orifice having a diameter of 0.3 mm at a temperature of 285° C. The undrawn filaments were drawn at a draw ratio such that the resultant drawn filaments exhibited an ultimate elongation of 30% by using a feed roller having a temperature of 84° C. and a heating plate having a temperature of 180° C. The resultant drawn filament yarn had a yarn count of 75 denier/24 filaments.

The copolyester filament yarn was dyed in the same manner as mentioned in Example 19.

In Example 31, the same procedures as those mentioned in Example 29 were carried out except that the tetra-n-butylphosphonium 3,5-dicarboxybenzenesulfonate was replaced by butyltriphenylphosphonium 3,5-dicarboxybenzenesulfonate.

In Example 32, the same procedure as those mentioned in Example 29 were carried out except that the tetra-n-butylphosphonium 3,5-dicarboxybenzenesulfonate was replaced by tetra-n-butylphosphonium 3,5-dicarbomethoxybenzenesulfonate, and the above-mentioned phosphonium organic sulfonate and the tetraethylammonium hydroxide were added to the ester exchange rection mixture before the start of the ester exchange reaction. The ester exchange reaction was smoothly conducted without any retardation or difficulty.

In Examples 33 and 34, the same procedures as those described in Example 29 were carried out except that the tetraethylammonium hydroxide was replaced by the quaternary ammonium salt shown in Table 7.

The properties of the copolyester resin and filament are shown in Table 7.

TABLE 7

| | Phosphonium organic sulfonate | | Ammonium salt | | Copolyester resin | | | | | | | | | Copolyester filament | | | |
|---|---|---|---|---|---|---|---|---|---|---|---|---|---|---|---|---|---|
| Example No. | Type | Amount (mol %/ DMT) | Type | Amount (mol %/ DMT) | [η] | L* | b* | SP (°C.) | DEG content (wt %) | The number of terminal carboxyl radicals | Heat resistance [η]10 min | [η]60 min | [η]f | Tensile strength (g/d) | Silk factor | Scission number (× 10[23]) | Dyed filaments |
| Example 28 | Tetra-n-butylphos-phonium 3,5-dicarbo-xybenzenesulfonate | 0.1 | Tetraethylammonium hydroxide | 0.003 | 0.67 | 67 | 4 | 257 | 1.50 | 39 | 0.68 | 0.64 | 0.62 | 4.9 | 27.2 | 35 | Brilliant blue |
| 29 | " | 1.5 | " | 0.05 | 0.68 | 66 | 5 | 255 | 1.52 | 42 | 0.69 | 0.65 | 0.63 | 5.1 | 27.8 | 65 | " |
| 30 | " | 1.5 | " | 0.1 | 0.65 | 64 | 8 | 251 | 1.65 | 47 | 0.67 | 0.63 | 0.60 | 5.2 | 28.5 | 62 | " |
| 31 | Butyltriphenylphos-phonium 3,5-dicarbo-xybenzenesulfonate | 1.5 | " | 0.05 | 0.67 | 66 | 6 | 255 | 1.53 | 43 | 0.68 | 0.64 | 0.61 | 4.8 | 26.7 | 72 | " |
| 32 | Tetra-n-butylphos-phonium 3,5-dicarbo-methoxybenzenesulfo-nate | 1.5 | " | 0.05 | 0.67 | 67 | 5 | 256 | 1.52 | 42 | 0.68 | 0.65 | 0.62 | 4.9 | 27.1 | 70 | " |
| 33 | Tetra-n-butylphos-phonium 3,5-dicarbo-xybenzenesulfonate | 1.5 | Tetraphenylammo-nium hydroxide | 0.05 | 0.67 | 66 | 5 | 256 | 1.53 | 43 | 0.69 | 0.65 | 0.63 | 5.0 | 27.2 | 88 | " |
| 34 | " | 1.5 | Tetra-n-butylammo-nium hydroxide | 0.05 | 0.67 | 67 | 6 | 255 | 1.54 | 42 | 0.68 | 0.63 | 0.60 | 4.9 | 26.8 | 85 | " |
| Comparative Example 9 | " | 1.5 | Tetraethylammonium hydroxide | 0 | 0.60 | 65 | 11 | 251 | 1.69 | 52 | 0.67 | 0.52 | 0.48 | 3.7 | 20.2 | 195 | Dull blue |
| 10 | " | 1.5 | " | 0.0001 | 0.61 | 64 | 10 | 252 | 1.63 | 50 | 0.67 | 0.53 | 0.48 | 3.8 | 20.4 | 182 | " |
| 11 | " | 1.5 | " | 2.5 | 0.61 | 61 | 9 | 253 | 1.64 | 53 | 0.66 | 0.55 | 0.46 | 4.1 | 22.5 | 157 | " |

Examples 35 to 39 and Comparative Examples 12 to 16

In each of Examples 35 to 39 and Comparative Examples 12 to 16, an ester exchange reaction vessel was charged with 100 parts by weight of dimethyl terephthalate, 66 parts by weight of ethyleneglycol, tetra-n-butylphosphomium 3,5-dicarbomethoxybenzenesulfonate in the amount in the range of from 0 to 9.6 parts by weight (0 to 3.5 molar % based on the molar amount of the dimethyl terephthalate) as shown in Table 8, 0.038 parts by weight (0.050 molar % based on the molar amount of the dimethyl terephthalate) of tetraethyl ammonium hydroxide and 0.03 parts by weight (0.024 molar % based on the molar amount of the dimethyl terephthalate) of manganese acetate tetrahydrate, and the resultant reaction mixture was subjected to an ester exchange reaction by elevating the temperature of the mixture from 140° C. to 230° C. over a period of 4 hours in a nitrogen gas atmosphere while the by-product consisting of methyl alcohol was removed to the outside of the reaction system.

The resultant reaction product was mixed with 0.03 parts by weight (0.033 molar % based on the molar amount of the dimethyl terephthalate) of orthophosphoric acid in the form of a 56% aqueous solution thereof and with 0.04 parts by weight (0.027 molar % based on the molar amount of the dimethyl terephthalate) of antimony trioxide. The resultant polymerization mixture was placed in a polymerization vessel. The inside pressure of the polymerization was reduced from 760 mmHg to 1 mmHg over a period of one hour and the temperature of the mixture was raised to from 230° C. to 280° C. over a period of 90 minutes. The polymerization procedure was further continued at a temperature of 280° C. under a pressure of 1 mmHg until the intrinsic viscosity of the resultant polyester resin reached the level indicated in Table 8.

The resultant copolyester resin was dried under vacuum at a temperature of 120° C. for 6 hours. The dried copolyester resin was melted at a temperature of at the highest 310° C. in an extruder having a melt spinneret with 72 orifices each having a diameter of 0.15 mm, the copolyester resin melt was extruded through the orifices, and the resultant fine copolyester multifilament yarn having a yarn count of 36 denier/72 filaments and an individual filament thickness of 0.5 denier was taken up at a high speed of 4300 m/min. In this melt-spinning process, the distance between the spinneret and a first take up roll (godet roller) was 3 m. The melt-spinning operation was effected under the conditions indicated in Table 8.

In each of Comparative Examples 15 and 16, the same procedures as those described above were carried out, except that the phosphonium organic sulfonate was replaced by sodium-3,5-dicarbomethoxybenzene sulfonate in the amount indicated in Table 8.

The results are shown in Table 8.

TABLE 8

| | | Phosphonium organic sulfonate | | Intrinsic viscosity $[\eta]_f$ | Melt spun filament | | | | | |
|---|---|---|---|---|---|---|---|---|---|---|
| Example No. | | Type | Amount (molar %/DMT) | | Melt-spinning operation | Tensile strength (g/d) | Silk factor | Scission number × 10²³ | L* | b* |
| Comparative Example | 12 | HOOC—⌬—COOH \| SO₃⊖P⊕BU₄ | 0 | 0.642 | Smooth | 4.4 | 31 | 26 | 84.5 | 6.5 |
| Example | 35 | " | 0.5 | 0.635 | " | 4.4 | 31 | 58 | 83.2 | 7.5 |
| | 36 | " | 1.0 | 0.624 | " | 4.2 | 30 | 66 | 82.5 | 8.0 |
| | 37 | " | 1.7 | 0.618 | " | 4.1 | 29 | 70 | 82.8 | 8.5 |
| | 38 | " | 2.6 | 0.629 | approximately smooth, very rarely filament breakage occurs | 4.0 | 28 | 81 | 82.3 | 8.8 |
| | 39 | " | 3.5 | 0.634 | " | 3.6 | 26 | 99 | 82.1 | 9.2 |
| Comparative Example | 13 | " | 4.0 | 0.610 | filament breakage occurs | 2.9 | 19 | 135 | 81.5 | 10.1 |
| | 14 | " | 2.6 | 0.485 | smooth | 3.1 | 21 | 80 | 83.5 | 8.2 |
| | 15 | CH₃OOC—⌬—COOCH₃ \| SO₃⊖Na⊕ | 1.3 | 0.536 | filament breakage occurs | 3.3 | 21 | 1010 | 88.2 | 5.8 |
| | 16 | " | 2.6 | 0.485 | often filament breakage occurs no sample was taken | — | — | 1320 | 89.5 | 6.8 |

Examples 40 and 41 and Comparative Examples 17 and 18

In each of Examples 40 and 41, an ester exchange reaction vessel was charged with 100 parts by weight of dimethyl terephthalate, 60 parts by weight of ethylenegycol, 0.03 parts by weight (0.024 molar % based on the molar amount of dimethyl terephthalate) of manganese acetate tetrahydrate and 0.009 parts by weight (0.007 molar % based on the molar amount of dimethyl terephthalate) of a color-regulating agent consisting of cobalt acetate tetrahydrate, the resultant reaction mixture was subjected to an ester exchange reaction in a nitrogen gas atmosphere while raising the temperature of the reaction mixture from 140° C. to 220° C. over a period of 3 hours, and removing methyl alcohol produced as a by product from the vessel to the outside thereof. The resultant ester exchange reaction product was mixed with 1.7 molar %, based on the molar amount of dimethyl terephthalate, of tetra-n-butyl phosphonium 3,5-dicarboxybenzenesulfonate in the form of a 20% by weight solution thereof in ethyleneglycol, and then with 0.020 molar %, based on the molar amount of dimethyl terephthalate, of tetra-n-butylphosphonium chloride in the form of a 85% solution thereof in water. The resultant reaction mixture was stirred at a temperature of 220° C. for 20 minutes and then mixed with 0.03 parts by weight (0.033 molar % based on the molar amount of dimethyl terephthalate) of a 56% aqueous solution of orthophosphonic acid, and then immediately heated to eliminate an excessive amount of ethyleneglycol from the reaction mixture. Ten minutes after the start of the heating, the reaction mixture was mixed with 0.04 parts by weight (0.027 molar % based on the molar amount of dimethyl terephthalate) of a polycondensation catalyst consisting of antimony trioxide. At the stage at which the inside temperature of the reaction vessel reached 240° C., the elimination of ethyleneglycol was stopped and the reaction mixture was moved to a polymerization vessel and heated under ambient atmospheric pressure until the temperature of the reaction mixture reached 260° C. Thereafter, the pressure in the polymerization vessel was reduced from 760 mmHg to 1 mmHg over a period of one hour, and simultaneously, the temperature of the reaction mixture was elevated to 280° C. over a period of 90 minutes. The reaction mixture was further heated at a polymerization temperature of 280° C. under a reduced pressure of 1 mmHg for 2 hours and then nitrogen gas was introduced to the polymerization vessel to break the vacuum and to stop the polymerization. The resultant copolyester resin was withdrawn from the polymerization vessel at a temperature of 280° C. under a pressure of the introduced nitrogen gas.

The resultant copolyester resin had a softening point (SP) of 253.6° C., a diethyleneglycol content of 1.65% by weight, a 10 minute withdrawing stage intrinsic viscosity $[\eta]_{10\ min}$ of 0.660 and a 60 minute withdrawing stage intrinsic viscosity $[\eta]_{60\ min}$ of 0.628.

The copolyester resin was completely melted at a temperature of 290° C. in a melt spinning apparatus having a spinneret having 24 melt-spinning orifices as shown in FIG. 3, in which the feeding hole 1 had a diameter of 5 mm, the extruding hole 2 had a diameter of 1.3 mm and a length of 1.0 mm and a melt guide bar 7 inserted into the orifice 3, and had a bar portion 6 having a diameter of 1.0 mm, an entire length of 5 mm, and a length of the projected portion thereof of 3 mm. The spinneret was heated at the temperature indicated in Table 9. The copolyester resin melt was extruded through the spinneret while the temperature of the melt was reduced to the same temperature as that of the spinneret.

The extruding rate of the copolyester resin melt was adjusted such that when the resultant filaments were drawn so that the resultant drawn filaments exhibited a thickness of about 3 denier and an ultimate elongation of 30%. The resultant filaments were taken up at a speed of 1000 m/min.

The resultant undrawn filaments had intrinsic viscosity $[\eta]_f$ as shown in Table 9.

The undrawn filaments were drawn at a preheating temperature of 80° C. to an extent such that the resultant drawn filaments exhibit an ultimate elongation of 30%, and then heat set by heating the drawn filaments at a temperature of 130° C. on a heating plate.

The drawn, heat set filaments had the individual filament thickness (d), tensile strength (g/d), and silk factor, and L* and b* values as shown in Table 9.

In each of Comparative Examples 17 and 18, the same procedures as those described above were carried out except that the melt spinning orifice had an extruding hole having a diameter of 0.3 mm, and a length of 0.6 mm and was not provided with the guide bar, and the temperature of the spinneret was adjusted to the level shown in Table 9.

The results are shown in Table 9.

Table 9 clearly shows that the copolyester filaments of Examples 40 and 41 in accordance with the present invention exhibited a satisfactory brightness, a satisfactory intrinsic viscosity $[\eta]_f$ of 0.5 or more, a high silk factor of more than 25, a small scission number of more than $55 \times 10^{23}/10^6$ g fiber, a high L* of more than 85 and a low b* of less than 7.0.

In Comparative Examples 17 and 18, copolyester filaments could not be produced by the melt-spinning procedures.

TABLE 9

| Example No. | | Melt-spinning orifice | Temperature of spinneret (°C.) | $[\eta]_f$ | Properties of filaments | | | | | |
|---|---|---|---|---|---|---|---|---|---|---|
| | | | | | Denier of individual filament | Tensile strength (g/d) | Silk factor | Scission number ($\times 10^{23}$) | L* | b* |
| Example | 40 | With melt guide bar | 260 | 0.630 | 3.0 | 5.3 | 29.3 | 45 | 91.0 | 5.8 |
| | 41 | | 270 | 0.610 | 2.8 | 5.5 | 29.5 | 53 | 90.1 | 6.0 |
| Comparative Example | 17 | Without melt guide bar | 260 | Could not be melt-spun | | | | | | |
| | 18 | | 270 | " | | | | | | |

Example 42

The same procedures as those described in Example 2 were carried out except that the tetra-n-butylphosphonium 3,5-dicarboxybenzenesulfonate was used in an amount of 1.5 molar % based on the molar amount of the dimethyl terephthalate.

The copolyester resin had a softening point (SP) of 253.6° C., an ethyleneglycol (DEG) content of 1.65% by weight, and an $[\eta]_{10\ min}$ of 0.660 and an $[\eta]_{60\ min}$ of 0.628.

The copolyester resin was melted at a temperature of 290° C. and was melt-extruded in the same manner as mentioned in Example 2, except that the take up speed was 1200 m/min, and the resultant filaments exhibited an $[\eta]_f$ of 0.630.

The undrawn filaments were drawn in the same manner as mentioned in Example 2 except that the resultant drawn filaments having a circular cross-sectional profile had an individual filament thickness of 3.0 denier, a tensile strength of 5.3 g/d, a silk factor of 29.3, and a scission number of 68 ×10²³.

The drawn filament yarn was twisted at a twist number of 300 turns/m.

The twisted copolyester filament yarn was converted to a plain weave (taffeta) having a warp density of 110 yarns/25.4 mm and a weft density of 86 yarns/25.4 mm.

The coplyester filament fabric was scoured in a scouring liquid containing 0.5% by weight of sodium carbonate and 1 g/l of a nonionic surfactant (trademark: Scourol 400, made by Kao Atras K.K.) at a temperature of 90° C. for 20 minutes, washed with water, dried and heat-set at a temperature of 170° C. for 30 minutes.

The heat-set fabric was dyed with a dyeing liquid containing 3%, based on the weight of the fabric, of a cationic blue dye (trademark: Aizen Cathilon Blue GRRH, made by Hodogaya Chemical Co.), 0.4 ml/l of acetic acid and 6 g/l of sodium sulfate 10 hydrate at a temperature of 130° C. for 60 minutes.

The dyed fabric was washed with an aqueous soluton of a non-ionic detergent at 80° C. for 20 minutes, and was dried at 120° C. for 3 minutes.

The dyed fabric was immersed in an aqueous solution containing 6% by weight of a fluorine-containing water-repellent agent (trademark: Asahiguard AC-730, made by Asahi Glass Co.), squeezed to pick up the solution in an amount of 100% based on the weight of the fabric, dried at 120° C. for one minute and heat-set at 160° C. for 30 seconds.

The heat set fabric was calendered at a temperature of 170° C. under a pressure of 20 kg/cm² by using a hot press roll.

The calendered fabric had a warp density of 135 yarns/25.4 mm and a weft density of 96 yarns/25.4 mm.

The properties of the fabric are shown in Table 10. The tests for the fabric were carried out as follows.

1. Brilliance (C* Value)

The color of the dyed fabric was analyzed by a spectrophotometer (trademark: Macbeth 2020, made by Cormorgen Co.) in accordance with JIS Z 8729 and Z 8730, to determine chromaticness factors a* and b*.

C* value was calculated from the values of a* and b* in accordance with the following equation.

$$C^* = \sqrt{a^{*2} + b^{*2}}$$

2. Tear Strength

Tear strength of the fabric was determined in weft direction to break warp yarns, in accordance with JIS L 1096 (1979), D method.

3. Resistance to Abrasion

Resistance to abrasion of the fabric was determined in accordance with JIS L 1018 (1977), B method by using an emery paper USA #0.

4. Light Fastness

The fabric was exposed to light in accordance with JIS L 084 (1971), carbon are method for 40 hours.

The discoloration (yellowish) of the tested fabric was evaluated by naked eyes.

The tear strength of the tested fabric was determined in accordance with JIS L 1018 (1977), B method.

5. Laundry Fastness

This was determined in accordance with JIS L 0844 (1973), A-2 method.

6. Color Transfer

A dyed fabric was superimposed on a white fabric, the laminate was heat pressed at a temperature of 70° C. under a pressure of 100 g/cm² for 10 hours.

The degree of color darkness on the white fabric was evaluated by naked eyes.

7. Water-repellency

This was determined in accordance with JIS L 1092 (1977), spray method.

The durability in water repellency of fabric was represented by the number of laundering operations necessary to decrease the degree of water repellency of the fabric to a level of 50% of the original water repellency. The laundering operation was carried out by using a home laundering machine in an aqueous solution of 2 g/l of weak alkaline synthetic detergent (Trademark: Zabu, made by Kao) at a temperature of 40° C. for 10 minutes, and the laundered fabric was rinsed with hot water for 5 minutes and then with cold water for 10 minutes.

The properties of the fabric are shown in Table 10.

Comparative Example 19

The same procedures as those described in Example 41 were carried out except that the tetra-n-butylphosphonium 3,5-dicarboxybenzenesulfonate was replaced by 2.6 molar % of sodium-3,5-dicarbomethoxybenzenesulfonate.

The resultant copolyester filament yarn having a yarn count of 75 deniers/24 filaments exhibited a tensile strength of 3.8 g/d, an ultimate elongation of 24%, a silk factor of 18.6 and a scission number of $1120 \times 10^{23}/10^6$ g.

The copolyester filament fabric was dyed in the same manner as mentioned in Example 41 except that the dyeing temperature was 120° C.

The properties of the fabric were shown in Table 10.

Comparative Example 20

An ordinary polyethylene terephthalate multifilament yarn having a yarn count up 75 deniers/24 filaments was produced by melt extruding a polyethylene terephthalate resin having an intrinsic viscosity of 0.64 and a melting point of about 261° C. through a spinneret having 24 orifice with a diameter of 0.35 mm at a temperature of 288° C., and by drawing in an ordinary manner.

The drawn filament yarn exhibited a tensile strength of 4.9 g/d, an ultimate elongation of 28%, a silk factor of 25.9, and a scission number of $18 \times 10^{23}/10^6$ g.

The drawn filament yarn was twisted at a twist number of 300 turns/m and was converted to a plain weave in the same manner as mentioned in Example 41.

The fabric was dyed in a dyeing liquid containing 3%, based on the weight of the fabric, of a disperse red dye (trademark: Sumikalon Red E-EBL, made by Sumitomo Kagaku K.K.), 0.3 g/l of acetic acid and 0.5 g/l of a dispersing agent (trademark: Disper VG, made by Meisei Kagaku K.K.) at a temperature of 130° C. for 60 minutes.

The properties of the fabric are shown in Table 10.

Comparative Example 21

A drawn nylon 6 multifilament yarn was produced from a poly-ε-capramide resin having an intrinsic viscosity of 1.02 by a conventional melt-spinning process at a temperature of 260° C. at a take up speed of 1200 m/min and by a conventional drawing process.

The nylon 6 multifilament yarn had a yarn count of 75 deniers/24 filaments, a tensile strength of 4.4 g/d, an ultimate elongation of 40° C. and a silk factor of 27.8.

The nylon 6 yarn was converted to a plain weave in the same manner as mentioned in Example 51.

The nylon 6 fabric was dyed in a dyeing liquid containing 3%, based on the weight of the fabric (owf), of an acid blue dye (trademark: Suminol Milling Blue GRN, made by Sumitomo Kagaku K.K.), 0.2% owf of acetic acid, 0.2% owf of sodium acetate and 0.4 g/l of a level dyeing agent (trademark: Migregal 2N, made by meisei Kagaku K.K.) at a temperature of 100° C. for 60 minutes.

The properties of the nylon 6 fabric are shown in Table 10.

Example 42

The non-calendered surface of the same dyed copolyester fabric as that described in Example 41 was coated with a polyurethane resin solution in the following composition by a floating knife coating method.

| Composition | Part by weight |
| --- | --- |
| Single liquid type polyurethane resin (trademark: Crysbon 2016E, made by Dainihon Ink, solid content: 30%) | 100 |
| Anti-blocking agent (trademark: Crysbon No. 5, made by Dainihon Ink) | 5 |
| Cross-linking agent (modified polyisocyanate, trademark: Crysbon NX, made by Dainihon Ink) | 3 |
| Methylethyl ketone | 10 |

The coated fabric was dried at a temperature of 80° C. for 30 seconds and then at a temperature of 100° C. for 30 seconds and heat-set at a temperature of 160° C. for one minute. The dry weight of the coating layer was 3.5 g/m².

The properties of the coated fabric are shown in Table 10.

Example 43

The non-calendered surface of the same dyed fabric so that mentioned in Example 41 was coated with an acrylic resin solution with the following composition by a floating knife coating method.

| Composition | Part by weight |
| --- | --- |
| Polyacrylate ester resin (trademark: Cryscoat P 1018, made by Dainihon Ink, solid content: 20% | 100 |
| Cross-linking agent (modified polyisocyanate, trademark: Crysbon NX) | 2 |
| Ethyl acetate Viscosity: 18000 cps | 15 |

The drying and heat setting procedure for the coated fabric were carried out in the same manner as in Example 42.

The properties of the coated fabric are shown in Table 10.

Comparative Examples 22 to 24

In comparative Example 22, the non-calendered surface of the same dyed fabric as mentioned in Comparative Example 19 was coated in the same manner as mentioned in Example 42.

In Comparative Example 23, the non-calendered surface of the same dyed fabric as mentioned in Comparative Example 20 was coated in the same manner as mentioned in Example 42.

In comparative Example 24, the non-calendered surface of the same dyed nylon 6 fabric as mentioned in Comparative Example 21 was coated in the same manner as mentioned in Example 42.

The properties of the coated fabrice are shown in Table 10.

Example 44

A surface of a polypropylene release sheet was coated with a single liquid type polyurethane liquid (trademark: Crysbon 3314, made by Dainihon Ink) at a coating dry weight of 8 g/m² by a doctor knife coating method, and dried at a temperature of 100° C. for 2 minutes. Further, the dried coating layer surface was coated with a two liquid type polyurethane coating liquid having the composition indicated below at a coating dry weight of 10 g/m² and dried at a temperature of 70° C. for one minute.

| Composition | Part by weight |
| --- | --- |
| Non-discoloration two liquid type polyurethane resin (trademark: Crysbon NT-150, made by Dainihon Ink) | 100 |
| Isocyanate (trademark: Parnoch DN-950, made by Dainihon Ink) | 10 |
| Catalyst (trademark: Auel T, Made by Dainihon Ink) | 3 |
| Solvent (Dimethyl formamide) | 15 |

The same dyed fabric as mentioned in Example 41 was superimposed on the coated polypropylene sheet so that the non-calendered surface of the dyed fabric comes into contact with the polyurethane resin-coated surface of the polypropylene sheet, the resultant laminate was heat-pressed by a pair of heat-pressing rolls at a temperature of 120° C. The laminate was aged for 2 days, and then the polypropylene release sheet was peeled from the laminate.

The properties of the resultant laminate are shown in Table 10.

Comparative Examples 25 to 27

The same lamination procedures as those described in Example 44 were applied to the non-calendered surfaces of the same dyed fabrics as mentioned in Comparative Examples 19 to 21.

The properties of the resultant laminates are shown in Table 10.

TABLE 10

| | Example No. | | Copolyester filament | | | | | | | Light fastness | | | Laundry fastness (class) | Color transfer fastness (class) | Durability in water repellency |
|---|---|---|---|---|---|---|---|---|---|---|---|---|---|---|---|
| | | | [η]f | Tensile strength (g/d) | Scission number (×10²³/10⁶ g) | Silk factor | Brilliance C* | Tear strength (g) | Abrasion resistance (time) | Discoloration (yellow) | Tear strength | | | |
| Dyed fabric | Example | 41 | 0.621 | 5.2 | 68 | 29.0 | 48 | 2800 | 252 | none | 2600 | 5 | 5 | 100 |
| | Comparative Example | 19 | 0.445 | 3.5 | 1120 | 18.0 | 45 | 800 | 45 | slightly | 150 | 5 | 4 | 10 |
| | | 20 | 0.612 | 4.8 | 18 | 23.3 | 18 | 2100 | 98 | none | 2000 | 1 | 2 | 20 |
| | | 21 | not measured | 4.3 | not measured | 27.5 | 26 | 2400 | 240 | remarkable | 400 | 3-4 | 4 | 5 |
| Dyed and resin-coated fabric | Example | 42 | 0.615 | 5.1 | 69 | 28.8 | 46 | 1500 | 260 | none | 1400 | 5 | 5 | 100 |
| | | 43 | 0.619 | 5.2 | 69 | 29.2 | 42 | 1800 | 258 | none | 1650 | 5 | 5 | 5 |
| | Comparative Example | 22 | 0.440 | 3.4 | 1122 | 17.5 | 38 | 200 | 48 | slightly | 50 | 4 | 4 | 8 |
| | | 23 | 0.610 | 4.8 | 19 | 23.1 | 16 | 1400 | 102 | none | 1350 | 1-2 | 1 | 4 |
| | | 24 | not measured | 4.1 | not measured | 27.3 | 21 | 1300 | 241 | remarkable | 300 | 3 | 4 | 3 |
| Dyed and resin-laminated fabric | Example | 44 | 0.615 | 5.1 | 71 | 28.7 | 47 | 2000 | 265 | none | 1800 | 5 | 5 | 100 |
| | Comparative Example | 25 | 0.438 | 3.3 | 1123 | 17.8 | 43 | 500 | 45 | slightly | 60 | 4-5 | 4 | 100 |
| | | 26 | 0.611 | 4.7 | 19 | 23.2 | 15 | 1800 | 104 | none | 1700 | 1 | 1 | 20 |
| | | 27 | not measured | 4.2 | not measured | 27.2 | 22 | 1750 | 242 | remarkable | 150 | 4 | 4 | 5 |

We claim:

1. An improved copolyester fiber comprising a copolyester resin composition comprising (A) a polymerization product of (a) principal copolymerization component comprising at least one aromatic dicarboxylic acid compound and at least one alkylene diol compound and (b) 0.1 to 10 molar %, based on the molar amount of the aromatic dicarboxylic acid compound, of an additional copolymerization component consisting of at least one quaternary phosphonium organic sulfonate of the general formula (I):

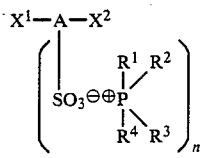   (I)

wherein A represents a member selected from aromatic and aliphatic redical, $X^1$ represents a member selected from the group consisting of a hydrogen atom and ester-forming organic radicals, $X^2$ represents an ester-forming organic radical which may be the same as or different from that represented by $X^1$, $R^1$, $R^2$, $R^3$ and $R^4$ respectively represent, independently from each other, a member selected from the group consisting of alkyl radicals and aryl radicals and n represents an integer of 1 or more, and having an intrinsic viscosity of 0.5 or more, determined in o-chlorophenol at a temperature of 35° C., and (B) 0.0005 to 2.0 molar %, based on the molar amount of the aromatic dicarboxylic acid component, of a thermal resistance-enhancing agent consisting of at least one quaternary onium salt, said copolyester fiber having a silk factor of 25 or more and exhibiting a scission number of backbone chains of the copolyester molecules of $140 \times 10^{23}$ or less per $10^6$ g of fiber when wet heat-treated in a solution of 0.4 g/l of acetic acid in distilled water at a temperature of 130° C. for 60 minutes.

2. The copolyester fiber as claimed in claim 1, wherein in the principal copolymerization component, the aromatic dicarboxylic acid compound is terephthalic acid and the diol compound is selected from alkylene glycols having 2 to 4 carbon atoms.

3. The copolyester fiber as claimed in claim 1, wherein the principal copolymerization component comprises terephthalic acid and ethylene glycol.

4. The copolyester fiber as claimed in claim 1, wherein the additional copolymerization component is in an amount of 0.3 to 5 molar % based on the molar amount of the aromatic dicarboxylic acid compound.

5. The copolyester fiber as claimed in claim 1, wherein in the formula (I), the ester-forming organic radical represented by $X^1$ and/or $X^2$ is selected from the group consisting of the radicals of the formulae:

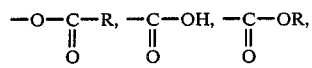

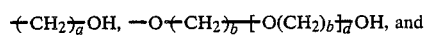

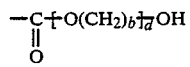

wherein R represents a member selected from the group consisting of lower alkyl radicals and phenyl radical, a and d represent an integer of 1 or more and b represents an integer of 2 or more.

6. The polyester fiber as claimed in claim 1, wherein in the formula (I), each of $R^1$, $R^2$, $R^3$ and $R^4$ represents a butyl radical.

7. The polyester fiber as claimed in claim 1, which exhibits a luminosity factor (L*) of 85 or more and a chromaticness factor (b*) of 7.0 or less defined in accordance with Japanese Industrial Standard Z-8730.

8. The polyester fiber as claimed in claim 1, which is an individual filaments having denier of 1.0 or less.

9. The copolyester fiber as claimed in claim 1, wherein the thermal resistance-enhancing agent consists of at least one member selected from quaternary phosphonium salts and quaternary ammonium salts.

10. The copolyester fiber as claimed in claim 9, wherein the quaternary phosphonium salt is selected from those of the formula (II):

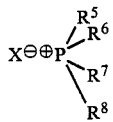   (II)

wherein X represents an anion residue having no ester forming organic redical, and $R^5$, $R^6$, $R^7$ and $R^8$ respectively represent, independently from each other, an organic radical.

11. The copolyester fiber as claimed in claim 1, wherein the thermal resistance-enhancing agent is in an amount of 0.1 to 20 molar % based on the molar amount of the additional copolymerization component.

* * * * *